US012650757B2

(12) United States Patent
Li et al.

(10) Patent No.: US 12,650,757 B2
(45) Date of Patent: Jun. 9, 2026

(54) INTERACTION METHOD, APPARATUS, DEVICE AND MEDIUM

(71) Applicant: Beijing Zitiao Network Technology Co., Ltd., Beijing (CN)

(72) Inventors: Long Li, Beijing (CN); Zhanchen Zhang, Beijing (CN); Lili Huang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 132 days.

(21) Appl. No.: 18/395,370

(22) Filed: Dec. 22, 2023

(65) Prior Publication Data

US 2024/0241618 A1 Jul. 18, 2024

(30) Foreign Application Priority Data

Jan. 13, 2023 (CN) .......................... 202310066364.9
Jan. 13, 2023 (CN) .......................... 202310081946.4
Jan. 16, 2023 (CN) .......................... 202310076988.9

(51) Int. Cl.
*G06F 3/0482* (2013.01)
*G06F 3/04815* (2022.01)

(52) U.S. Cl.
CPC ........ *G06F 3/0482* (2013.01); *G06F 3/04815* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 7,062,722 B1 * | 6/2006 | Carlin | ..................... | G06T 15/10 |
| | | | | 715/848 |
| 7,757,157 B1 * | 7/2010 | Fukuda | ............ | H04N 21/23412 |
| | | | | 715/201 |
| 8,605,115 B2 * | 12/2013 | Dettinger | ............... | G06Q 90/00 |
| | | | | 705/14.1 |
| 2002/0093538 A1 * | 7/2002 | Carlin | .................... | G06Q 30/02 |
| | | | | 715/778 |
| 2005/0289156 A1 * | 12/2005 | Maryka | ............... | G06F 16/9577 |

(Continued)

FOREIGN PATENT DOCUMENTS

| | | |
|---|---|---|
| CN | 108107580 A | 6/2018 |
| CN | 110507992 A | 11/2019 |

(Continued)

OTHER PUBLICATIONS

Mozilla Hubs, "IEEEVR—How to use Hubs' basic features & controls", published May 18, 2020, available at <<https://www.youtube.com/watch?v=YppUt2N811k >>, 15 pages (Year: 2020).*

(Continued)

*Primary Examiner* — Daniel Rodriguez
(74) *Attorney, Agent, or Firm* — BakerHostetler

(57) ABSTRACT

This application provides an interaction method, apparatus, device and medium. The method includes: displaying information of material or materials used in a virtual scene in response to a viewing instruction of a first user for the virtual scene; and displaying a detail page of a target material in response to a first operation on information of the target material used in the virtual scene.

20 Claims, 13 Drawing Sheets

(56) References Cited

U.S. PATENT DOCUMENTS

| | | | | | |
|---|---|---|---|---|---|
| 2007/0124669 | A1* | 5/2007 | Makela | | G06F 16/9577 |
| | | | | | 715/764 |
| 2007/0294250 | A1* | 12/2007 | Linder | | G06F 16/9577 |
| 2008/0301300 | A1* | 12/2008 | Toub | | H04L 67/306 |
| | | | | | 709/227 |
| 2010/0050100 | A1* | 2/2010 | Dettinger | | G06Q 90/00 |
| | | | | | 715/764 |
| 2010/0333026 | A1* | 12/2010 | Hooper | | G06T 19/00 |
| | | | | | 345/589 |
| 2013/0007669 | A1* | 1/2013 | Lu | | G11B 27/034 |
| | | | | | 715/848 |
| 2013/0093765 | A1* | 4/2013 | Buchauer | | G06Q 50/01 |
| | | | | | 345/419 |
| 2013/0296043 | A1* | 11/2013 | Weinshanker | | A63F 13/63 |
| | | | | | 463/30 |
| 2014/0132633 | A1* | 5/2014 | Fekete | | G06Q 50/01 |
| | | | | | 345/634 |
| 2018/0011621 | A1* | 1/2018 | Roos | | G06T 19/003 |
| 2020/0026806 | A1* | 1/2020 | Ullom | | G06T 19/003 |
| 2020/0188781 | A1* | 6/2020 | Stephens | | G06F 3/04842 |
| 2020/0357155 | A1* | 11/2020 | Casella | | G06T 15/20 |
| 2021/0089639 | A1* | 3/2021 | Remillet | | G06F 21/32 |
| 2021/0279695 | A1* | 9/2021 | Rice | | G06Q 20/12 |
| 2021/0405746 | A1* | 12/2021 | Canberk | | G06F 3/013 |
| 2022/0036616 | A1* | 2/2022 | Kondoh | | G06F 3/011 |
| 2022/0293008 | A1* | 9/2022 | Sha | | G06V 40/174 |
| 2023/0169877 | A1* | 6/2023 | Mathes | | G09B 5/06 |
| | | | | | 434/308 |
| 2023/0241501 | A1* | 8/2023 | Wu | | A63F 13/5372 |
| | | | | | 463/31 |
| 2024/0020917 | A1* | 1/2024 | Ni | | G04G 21/00 |
| 2024/0064199 | A1* | 2/2024 | Yerli | | H04L 65/4046 |

FOREIGN PATENT DOCUMENTS

| | | |
|---|---|---|
| CN | 112068757 A | 12/2020 |
| CN | 114073855 A | 2/2022 |

OTHER PUBLICATIONS

Anthony White, "Creating a Virtual Art Gallery in Hubs by Mozilla", published May 15, 2020, available at <<https://www.youtube.com/watch?v=WQWEFBocqkl>>, 16 pages (Year: 2020).*

* cited by examiner

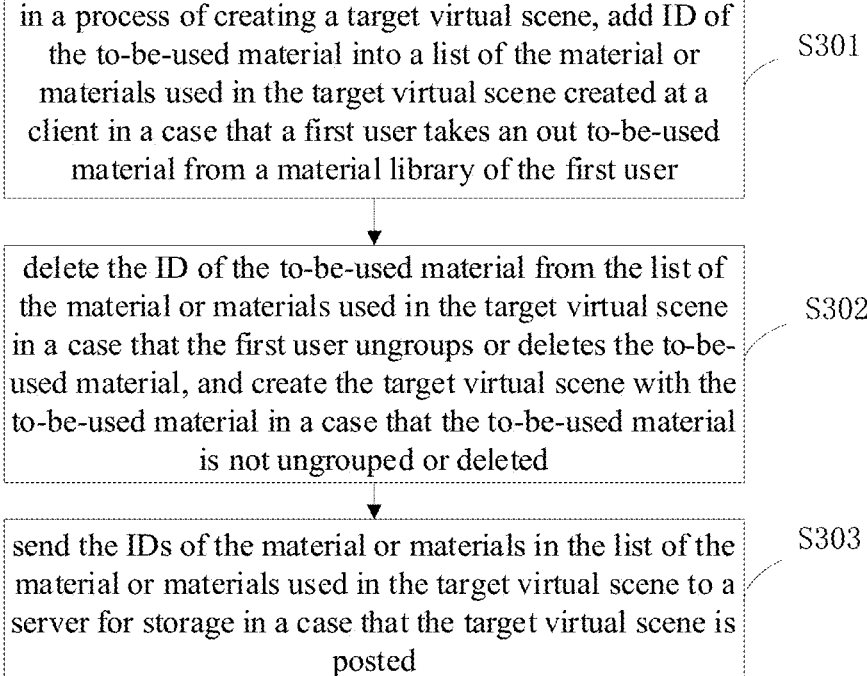

in a process of creating a target virtual scene, add ID of the to-be-used material into a list of the material or materials used in the target virtual scene created at a client in a case that a first user takes an out to-be-used material from a material library of the first user    S301 delete the ID of the to-be-used material from the list of the material or materials used in the target virtual scene in a case that the first user ungroups or deletes the to-be-used material, and create the target virtual scene with the to-be-used material in a case that the to-be-used material is not ungrouped or deleted    S302 send the IDs of the material or materials in the list of the material or materials used in the target virtual scene to a server for storage in a case that the target virtual scene is posted    S303

FIG. 7

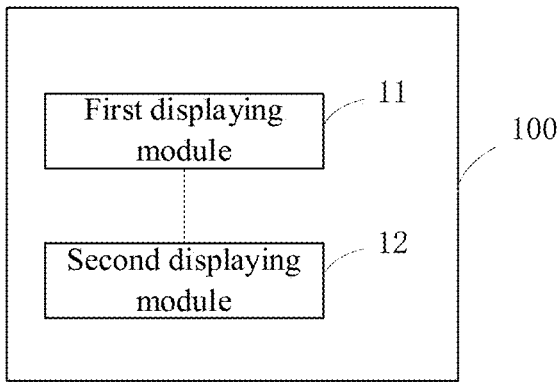

First displaying module    11

Second displaying module    12

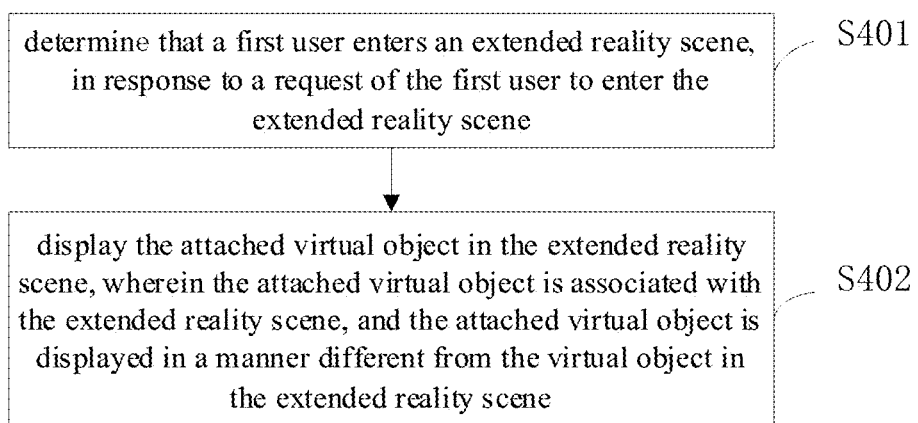

determine that a first user enters an extended reality scene, in response to a request of the first user to enter the extended reality scene ⟋ S401 display the attached virtual object in the extended reality scene, wherein the attached virtual object is associated with the extended reality scene, and the attached virtual object is displayed in a manner different from the virtual object in the extended reality scene ⟋ S402

FIG. 9

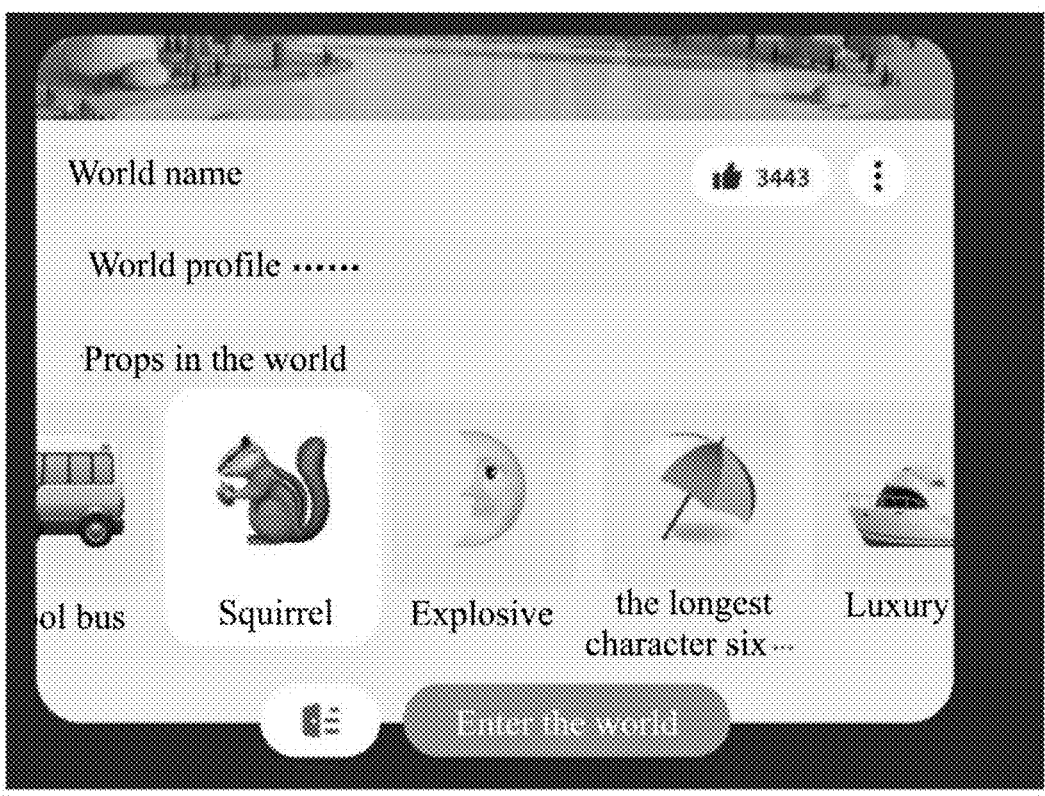

FIG. 10

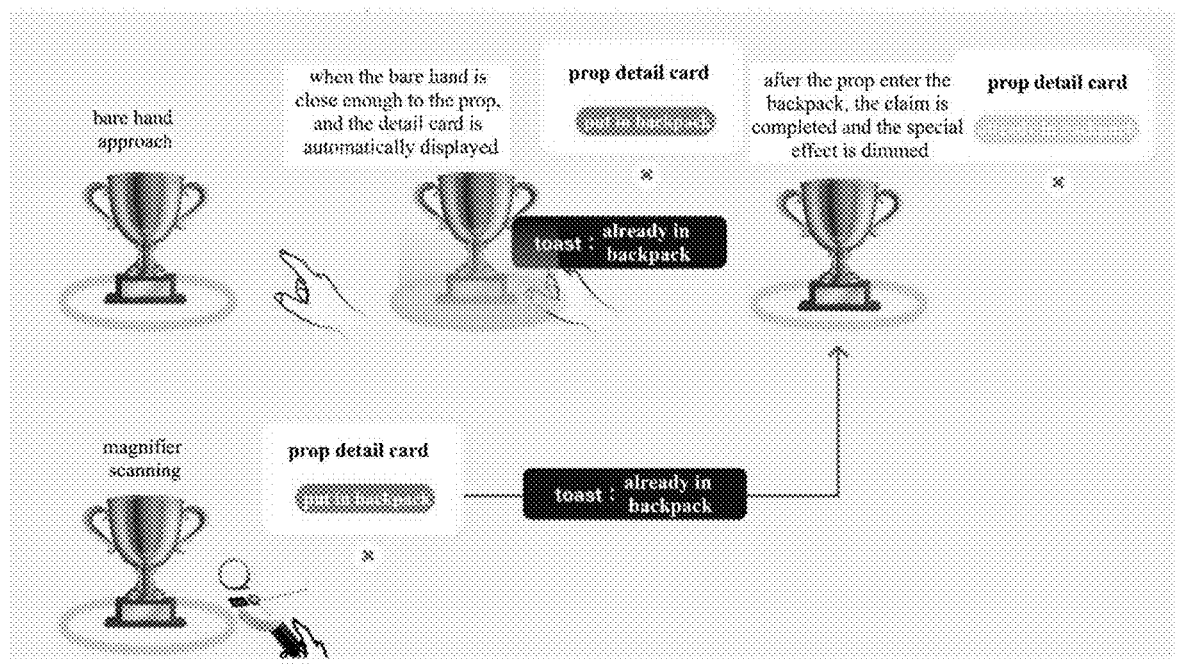

FIG. 13

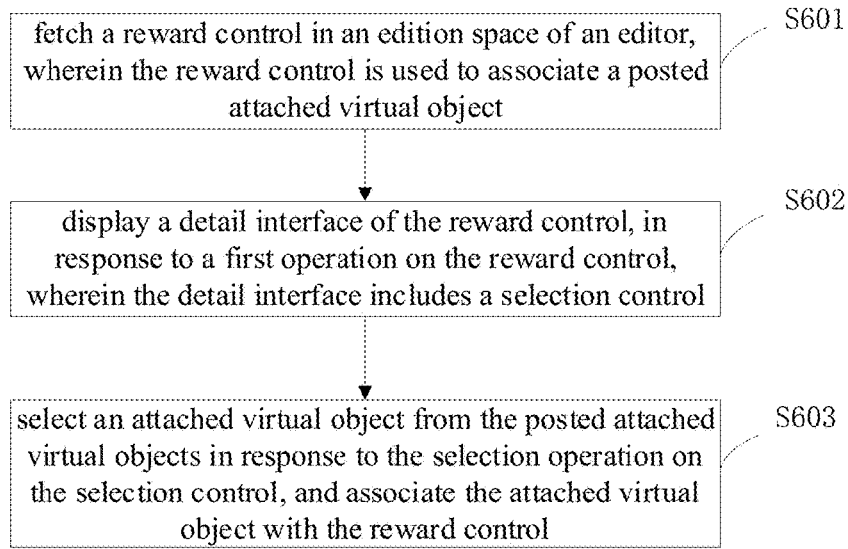

fetch a reward control in an edition space of an editor, wherein the reward control is used to associate a posted attached virtual object — S601 display a detail interface of the reward control, in response to a first operation on the reward control, wherein the detail interface includes a selection control — S602 select an attached virtual object from the posted attached virtual objects in response to the selection operation on the selection control, and associate the attached virtual object with the reward control — S603

FIG. 14

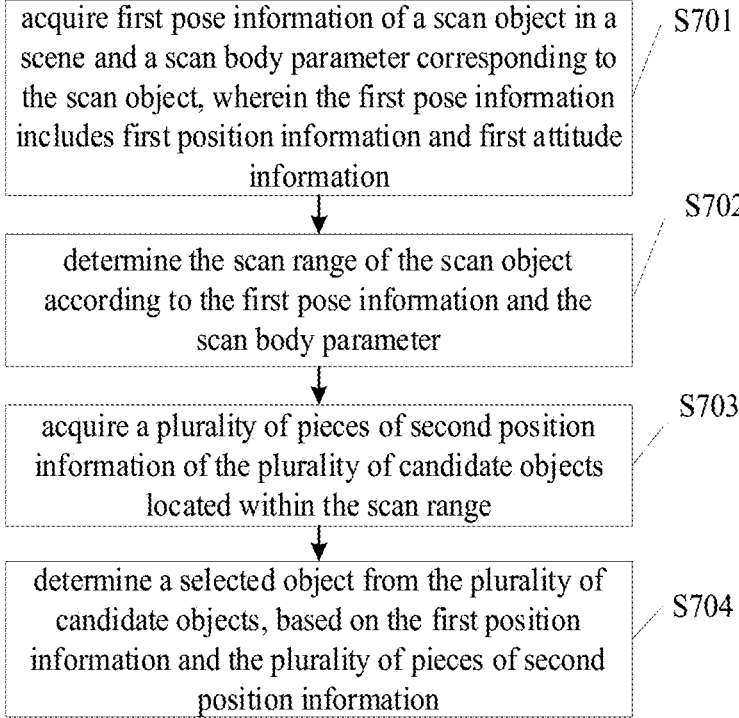

acquire first pose information of a scan object in a
scene and a scan body parameter corresponding to
the scan object, wherein the first pose information
includes first position information and first attitude
information                                                    S701 determine the scan range of the scan object
according to the first pose information and the
scan body parameter                                           S702 acquire a plurality of pieces of second position
information of the plurality of candidate objects
located within the scan range                                 S703 determine a selected object from the plurality of
candidate objects, based on the first position
information and the plurality of pieces of second
position information                                           S704

FIG. 19

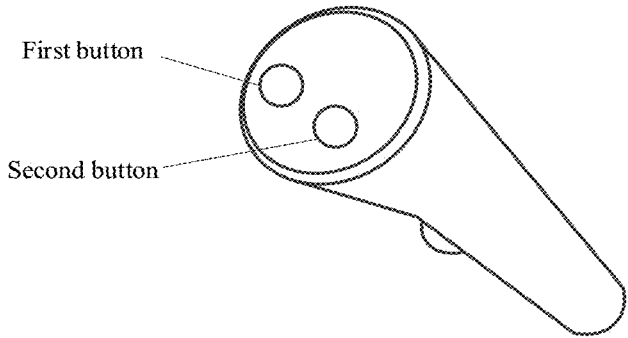

First button

Second button

FIG. 20

INTERACTION METHOD, APPARATUS, DEVICE AND MEDIUM

CROSS-REFERENCE TO RELATED APPLICATIONS

This application claims the priorities of Chinese Patent Application No. 202310081946.4 filed on Jan. 13, 2023, Chinese Patent Application No. 202310076988.9 filed on Jan. 16, 2023, and Chinese Patent Application No. 202310066364.9 filed on Jan. 13, 2023, and the disclosures of these applications are incorporated by reference herein in their entireties as part of the present application.

TECHNICAL FIELD

Embodiments of this application relate to an interaction method, an apparatus, a device and a non-transient medium.

BACKGROUND

Extended Reality (XR) refers to the combination of reality and virtuality through computers to create a virtual environment that can interact with humans. XR is also a collective term for various technologies such as Virtual Reality (VR), Augmented Reality (AR), and Mixed Reality (MR). The combination of the three visual interaction technologies brings a seamless "immersion" between the virtual world and the real world to experimenters.

In the XR scenario, in order to meet the personalized needs of users, the User 15 Generated Content (UGC) function has been added, which allows the users to customize a virtual scene using elements such as materials in a provided editor according to their needs.

SUMMARY

An embodiment of the present application provides an interaction method, including: displaying information of material or materials used in a virtual scene in response to a viewing instruction of a first user for the virtual scene; and displaying a detail page of a target material in response to a first operation on information of the target material used in the virtual scene.

In some embodiments, the detail page of the target material includes a collection control, and the method further includes: collecting the target material into a favorite of a material library of the first user in response to a second operation on the collection control.

In some embodiments, displayed material or materials used in the virtual scene are material or materials that have been posted into the material library when the virtual scene is created.

In some embodiments, the displayed material or materials used in the virtual scene are not re-created by a creator of the virtual scene, wherein material or materials are not re-created by the creator of the virtual scene includes: a single material composed of a plurality of geometries is not ungrouped by the creator of the virtual scene, and/or each of materials in a combined material composed of a plurality of materials is not ungrouped by the creator of the virtual scene and any one material in the combined material is not deleted.

In some embodiments, the displaying information of material or materials used in a virtual scene in response to a viewing instruction of a first user for the virtual scene, includes: performing sorting to display the materials used in the virtual scene from high to low according to a usage frequency of the materials, or performing sorting to display the materials according to a usage number of the materials in the virtual scene, or performing sorting to display the materials according to a number of geometries contained in the materials in response to the viewing instruction of the first user for the virtual scene.

In some embodiments, the displaying information of material or materials used in a virtual scene in response to a viewing instruction of a first user for the virtual scene, includes: sending a material request to a server in response to the viewing instruction of the first user for the virtual scene; and displaying the information of the material or materials used in the virtual scene according to material information returned by the server, wherein the material information is determined according to identifiers (IDs) of the material or materials used in the virtual scene, and the IDs of the material or materials used in the virtual scene is sent to the server for storage when a creator of the virtual scene posts the virtual scene.

In some embodiments, the method further includes: in a process of creating a target virtual scene, adding an identifier (ID) of a to-be-used material into a list of the material or materials used in the target virtual scene created at a client when the first user takes out the to-be-used material from a material library of the first user; deleting the ID of the to-be-used material from the list of the material or materials used in the target virtual scene when the first user ungroups or deletes the to-be-used material; creating the target virtual scene with the to-be-used material when the to-be-used material is not ungrouped or deleted; and sending the ID of the material or materials in the list of the material or materials used in the target virtual scene to a server for storage when the target virtual scene is posted.

In some embodiments, the material or materials used in the virtual scene are virtual objects that constitute the virtual scene.

In some embodiments, the virtual scene is a scene defined by a second user, or the material or materials are materials defined by the second user.

In some embodiments, the viewing instruction is triggered by the first user before entering the virtual scene; or the viewing instruction is triggered by the first user after entering the virtual scene.

The embodiment of the present application provides an interaction apparatus, including: a first displaying module, configured to display information of material or materials used in a virtual scene in response to a viewing instruction of a first user for the virtual scene; and a second displaying module, configured to display a detail page of a target material in response to a first operation on information of the target material used in the virtual scene.

An embodiment of the present application provides an electronic device, including: at least one processor and at least one memory, wherein the at least one memory is configured to store computer programs; the at least one processor is configured to invoke and execute the computer programs stored in the at least one memory to execute the method as described in any of the above embodiments.

An embodiment of the present application provides a non-transient computer readable storage medium, storing computer programs, wherein the computer programs, upon being executed by a computer, cause the computer to execute the method as described in any of the above embodiments.

An embodiment of the present application provides a computer program product, including computer programs, wherein the computer programs, when executed by a computer, implement the method as described in any of the above embodiments.

BRIEF DESCRIPTION OF THE DRAWINGS

To describe technical solutions in embodiments of the present disclosure more clearly, the following briefly describes the accompanying drawings required for describing the embodiments. Definitely, the accompanying drawings in the following description show merely some embodiments of the present disclosure, and a person of ordinary skill in the art may still derive other drawings from these accompanying drawings without creative efforts.

FIG. 7 is a flowchart of an interaction method according to one or more embodiments of this application;

FIG. 8 is a structural schematic diagram of an interaction apparatus according to one or more embodiments of this application;

FIG. 9 is a flow of an issuing method of a virtual object provided by one or more embodiments of the present disclosure;

FIG. 10 is a schematic diagram of a detail page of an extended reality scene;

FIG. 13 is a schematic diagram of a claim process of an attached virtual object;

FIG. 14 is a flowchart of an associating method of a virtual object and an extended reality scene provided by one or more embodiments of the present disclosure;

FIG. 19 is a schematic flowchart of an object selecting method provided by one or more embodiments of the present disclosure;

FIG. 20 is a schematic structural diagram of a handheld apparatus provided by one or more embodiments of the present disclosure;

4

Figure 22:
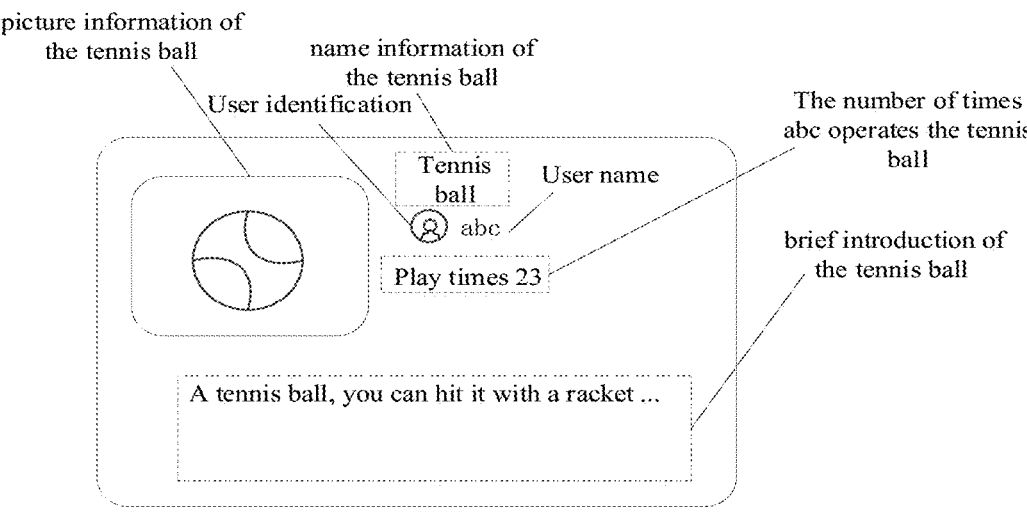
Figure 23:
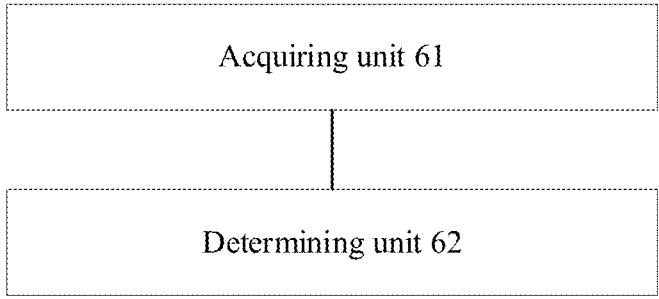
Figure 24:
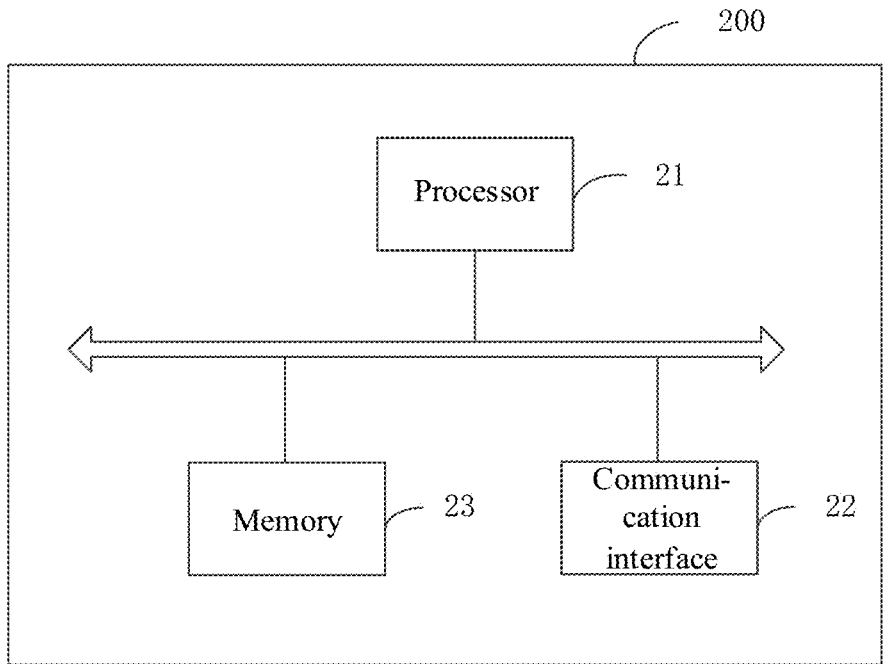

FIG. 22 is a schematic diagram of detail information corresponding to a tennis ball provided by one or more embodiments of the present disclosure;

FIG. 23 is a schematic structural diagram of an object selecting apparatus provided by one or more embodiments of the present disclosure; and FIG. 24 is a structural schematic diagram of an electronic device according to one or more embodiments of this application.

DETAILED DESCRIPTION

The following clearly and completely describes the technical solutions in the embodiments of this application with reference to the accompanying drawings in the embodiments of this application. Definitely, the described embodiments are some of the embodiments of this application rather than all of the embodiments. Based on the embodiments of this application, all other embodiments derived by those of ordinary skill in the art without any creative efforts fall within the protection scope of this application.

It is to be noted that the terms "first", "second" and the like in the description and claims of the present disclosure and the accompanying drawings are used for distinguishing similar objects, without having to be used for describing a particular order or sequence. It is to be understood that the data so used are interchangeable under appropriate circumstances such that the embodiments of the present disclosure described herein can be practiced in sequences other than those illustrated or described herein. In addition, the terms "include" and "have" and any variations thereof are intended to cover non-exclusive inclusion, e.g., a process, method, system, product, or server that includes a series of steps or units is not necessarily limited to those clearly listed, but may include other steps or units that are not clearly listed or are inherent to such processes, methods, products, or devices.

In order to facilitate the understanding of the embodiments of this application, before describing each embodiment of this application, appropriate explanations and explanations of some concepts involved in all embodiments of this application are provided, as follows:

XR is a general term of VR, AR and AR technologies, XR devices include are not limited to a VR device, an AR device and a MR device, and the XR devices conforms to openXR standard.

VR: It is a technology for creating and experiencing a virtual world, and it can compute to generate a virtual environment, and involves multi-source information (the virtual reality mentioned herein includes at least visual perception, and may also include auditory perception, tactile perception, motion perception, and even also includes taste perception, olfactory perception, etc.). It realizes the simulation of the fused and interactive three-dimensional dynamic scene and entity behavior of the virtual environment, and enables the user to immerse in the simulated virtual reality environment, thus realizing the application in a plurality of virtual environments such as map, game, video, education, medical treatment, simulation, cooperative training, sales, assisted manufacturing, maintenance and repair.

The VR device refers to a terminal for achieving a virtual reality effect, and may be generally provided as forms of glasses, a Head Mount Display (HMD) and contact lenses, so as to achieve visual perception and perception of other forms. Definitely, the forms realized by the virtual reality devices are not limited, and the virtual reality devices may be further miniaturized or enlarged according to needs.

AR: AR scene is a simulated scene in which at least one virtual object is superimposed on a physical scene or a representation thereof. For example, an electronic system may have an opaque display, and at least one imaging sensor for capturing images or videos of the physical scene, which are representations of the physical scene. The system combines the images or videos with the virtual object, and displays the combination on the opaque display. An individual uses the system to view the physical scene indirectly via the images or videos of the physical scene, and observes the virtual object superimposed on the physical scene. When the system captures the images of the physical scene with one or more image sensors, and presents the AR scene on the opaque display using those images, the displayed images are referred to as video passthrough. Optionally, the electronic system for displaying the AR scene may have a transparent or translucent display through which the individual can view the physical scene directly. The system may display the virtual object on the transparent or translucent display, so that the individual can use the system to observe the virtual object superimposed on the physical scene. As another example, the system may include a projection system that projects the virtual object into the physical scene. The virtual object may be projected, for example, on a physical surface or as a hologram, so that the individual can use the system to observe the virtual object superimposed on the physical scene. Specifically, it is a technology for computing camera pose parameters of a camera in real world (or called three-dimensional world, actual world) in real time during image acquisition by the camera, and adding virtual elements to the images acquired by the camera based on the camera pose parameters. The virtual elements include, but are not limited to, images, videos and three-dimensional models. The objective of the AR technology is to interact by nesting the virtual world on the real world on a screen.

MR: It is to present virtual scene information in a real scene to build an interactive feedback information loop among the real world, the virtual world and the user, so as to enhance the sense of reality of the user experience. For example, computer-created sensory inputs (e.g., virtual objects) are integrated in a simulated scene with sensory inputs from a physical scene or representations thereof, and in some MR scenes, the computer-created sensory inputs may be adapted to changes in the sensory inputs from the physical scene. In addition, some electronic systems for presenting the MR scenes may monitor orientation and/or location relative to the physical scene, so as to enable virtual objects to interact with real objects (i.e., physical elements from the physical scene or representations thereof). For example, the system may monitor motion, and thus virtual plants is stationary relative to the physical building.

Virtual reality devices (VR devices): They are terminals for realizing a virtual reality effect, and may be generally provided with forms of glasses, a Head Mount Display (TIMID) and contact lenses, so as to realize visual perception and perception of other forms. Definitely, the forms realized by the virtual reality devices are not limited, and the virtual reality devices may be further miniaturized or enlarged according to actual needs.

Optionally, the virtual reality devices (XR devices) according to the embodiment of this application may include but not limited to the following types:

1) Mobile virtual reality device: It supports the setting of a mobile terminal (such as a smart phone) in various modes (such as a head mount display with a special card slot), and it is connected to the mobile terminal in a wired or wireless way; and the mobile terminal performs related computation of a virtual reality function, and outputs data to the mobile virtual reality device, for example, a virtual reality video can be watched through an APP of the mobile terminal.

2) All-in-one machine virtual reality device: It is provided with a processor for performing related computation on a virtual function, so it has independent virtual reality input and output functions, does not need to be connected with a PC end or the mobile terminal, and is high in use freedom degree.

3) Personal computer virtual reality (PCVR) device: It is capable of performing related computation on a virtual reality function and data output; and an external PVCR device can realize a virtual reality effect by utilizing the data outputted by a PC.

Figure 1:
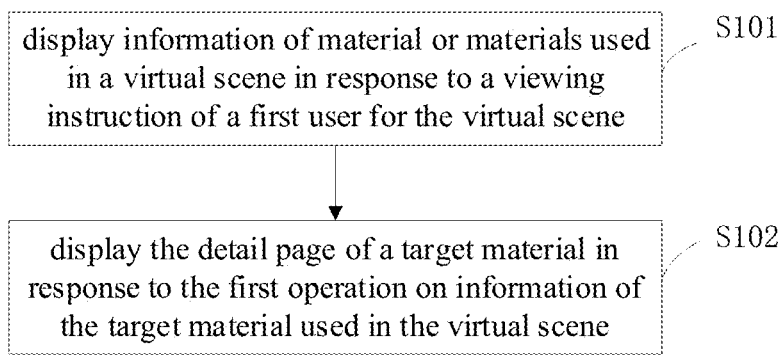
FIG. 1 is a flowchart of an interaction method provided according to one or more embodiments of this application.

FIG. 1 is a flowchart of an interaction method according to one or more embodiments of this application. The method according to this embodiment is executed by an electronic device, and the electronic device includes, but is not limited to, an XR device, a mobile phone, a computer, wearable equipment and the like. As shown in FIG. 1, the method provided by this embodiment includes the following steps S101 and S102.

S101: display information of material or materials used in a virtual scene in response to a viewing instruction of a first user for the virtual scene.

The virtual scene may be a 3D extended reality scene provided by the XR device, and may also be a 2D virtual scene provided by the mobile phone, the computer and the like.

The virtual scene may be a scene provided by the client, and may also be a scene defined by the user. Taking the XR device as an example, in order to meet the personalized requirements of the user, a UGC function is added, that is, the user can customize a virtual scene in an editor provided in a game according to the requirements; the virtual scene defined by the user is also called the world of the user; and other users may enter the scene defined by the user to play.

The editor can provide editing elements such as polyhedra, controls, textures, physics, logic, music, sound effects, special effects and materials for the user to use. The user can customize the virtual scene in the editor and may also customize the materials; the materials defined by the user may be called UGC materials; and meanwhile, the virtual scene defined by the user may be called a UGC world or a UGC scene. The customization in the embodiment of this application may be understood as that the user autonomously build an object or a scene with the editing elements provided by the editor in the editor.

Generally, the editor has a material library, the material library includes some built-in materials of the system, and may also include some materials defined or collected by the user; the materials in the system library are dynamically changed, namely the materials in the system material library are continuously updated and perfected; the user may post the defined materials into the material library for other users to use, or does not post the defined materials, but stores the defined materials locally for own use.

The virtual scene may comprise materials, polyhedra, controls, textures, logic, sound effects and the like; the materials forming the virtual scene are the materials in the material library, and may also be the materials which are defined by the user and are not posted to the material library, and the embodiment of this application does not limit it.

Figure 2:
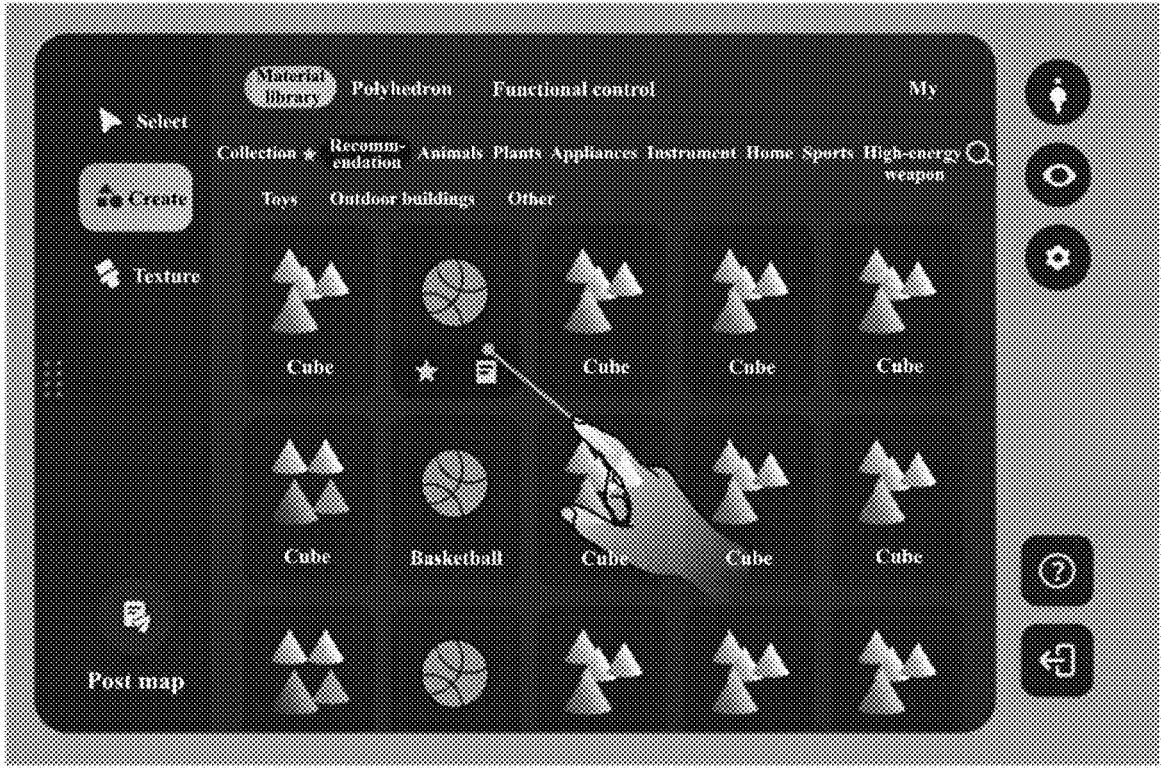
FIG. 2 is a selection schematic diagram of editing elements of an editor.

Optionally, the virtual scene is a virtual scene defined by a second user; and after the second user creates and posts the virtual scene in the editor, other users may view the virtual scene. FIG. 2 is a selection schematic diagram of editing elements of an editor; as shown in FIG. 2, the user enters an editing interface through a "create" entrance of the editor; there are three menus of a material library, a polyhedron and a function control in the editing interface; the user can click the menu of the material library to enter the material library, and the material library includes a plurality of materials; taking the XR device as an example, after selecting a certain material through a ray, the user can click a trigger key of a controller of the XR device to place the material into the virtual scene.

Figure 3:
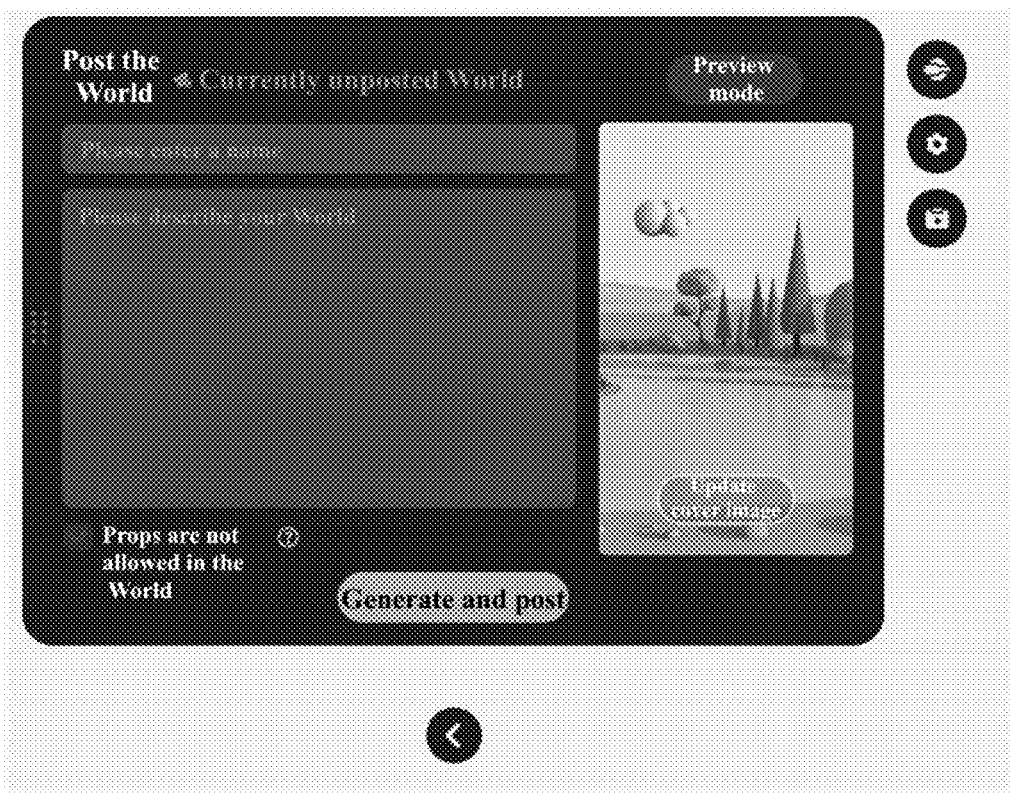
FIG. 3 is a schematic diagram of a virtual scene posting interface.

After creating the virtual scene, the user may posts the created virtual scene; FIG. 3 is a schematic diagram of a virtual scene posting interface; the virtual scene posting refers to posting the virtual scene into the network; only the successfully sent virtual scene can be queried by other users; and if the virtual scene defined by the user is not posted, only the user can view the virtual scene.

In the embodiment of this application, the first user may trigger the viewing instruction before entering the virtual scene to view the virtual scene, and may also trigger the viewing instruction after entering the virtual scene. The user can trigger the viewing instruction under a viewing requirement; the viewing instruction may be inputted by the user through the controller of the XR device, and may also be inputted by the user with voice or gesture; and the user may interact with the virtual scene in any existing interaction mode, which is not limited in the embodiment of this application.

For example, when the first user plays in a game, and wants to enter the virtual scenes created by other users, the first user needs to call out a list of the posted virtual scenes, the list including the virtual scenes of a plurality of users, and then the user may select the virtual scene of interest and click to view the virtual scene.

In one embodiment, displaying the list of materials in response to a viewing instruction of a first user for a virtual scene, the list of materials including information of materials used in the virtual scene.

The materials used in the virtual scene are virtual objects constituting the virtual scene, and the materials are virtual objects with physical shapes, and they may be a basketball, a tree, a house, a table and the like.

The information of the materials used in the virtual scene includes but is not limited to: thumbnails and/or names of the materials.

In another embodiment, displaying a detail page of the virtual scene in response to a viewing instruction of a first user for a virtual scene, the information of materials used in the virtual scene is displayed in the detail page of the virtual scene.

In this embodiment, the displayed materials used in the virtual scene may include materials in the material library, and may also include materials defined by the second user, and the second user may be a creator of the virtual scene; and definitely, the materials defined by the first user and other users outside the second user may also be included.

Figure 4:
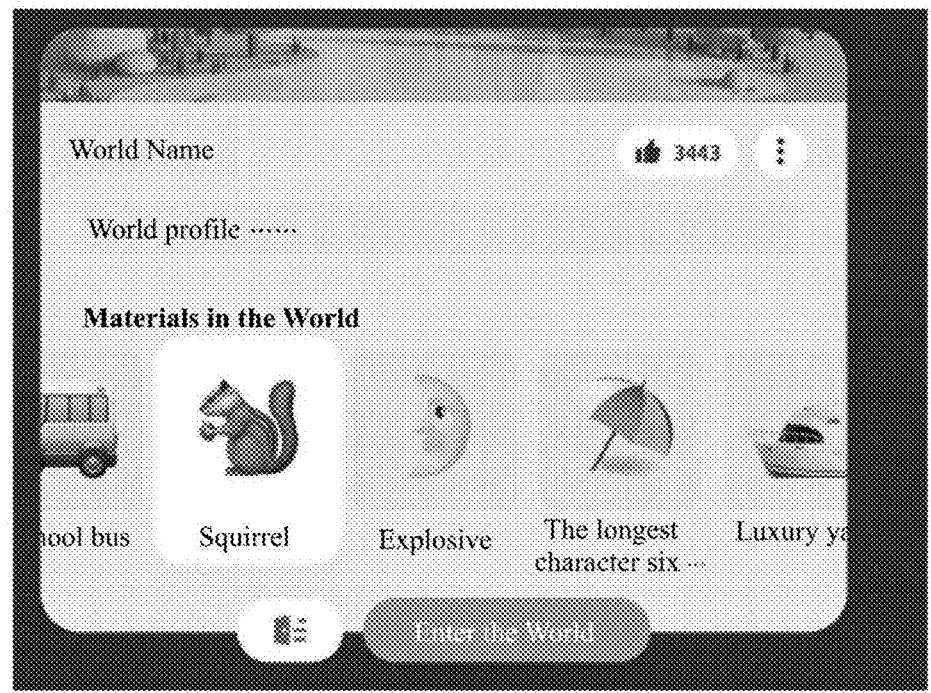
FIG. 4 is a display schematic diagram of information of materials used in a virtual scene.

FIG. 4 is a display schematic diagram of information of materials used in a virtual scene; as shown in FIG. 4, this page is the detail page of the virtual scene; the detail page includes some brief introductions of the virtual scene, an entrance of the virtual scene, and display areas of the information of the materials used in the virtual scene; and the display areas display "materials in the world" in the figure and thumbnails and names below the materials. The user may browse more materials by sliding left and right the display area.

Optionally, the displayed material or materials used in the virtual scene are material or materials posted to the material library when the virtual scene is created. The materials in the material library may be understood as known shared materials stored in the server, and all users can use them, that is, the displayed materials used in the virtual scene are shared materials. If there are some private materials which are defined by the user but are not posted to the material library in the virtual scene, these private materials will not be displayed in the case that the display is carried out according to the viewing instruction, that is, other users cannot see the private materials and can only see the materials posted to the material library when the virtual scene is created. By displaying the known shared materials in the server, the user can obtain the information of the materials through the IDs of the materials, so that the subsequent user can conveniently use the materials to create own virtual scene or carry out secondary creation.

If a material constituting the virtual scene is deleted from the material library by the creator of the material or a management platform of the material library, the deleted material will not be displayed in the case that information of the materials used in the virtual scene is displayed.

Optionally, the displayed materials used in the virtual scene are not re-created by the creator of the virtual scene, and that the materials are not re-created by the creator of the virtual scene includes that: a single material composed of a plurality of geometries is not ungrouped by the creator of the virtual scene, and/or, each of materials in a combined material composed of a plurality of materials is not ungrouped by the creator of the virtual scene and any one material in the combined material is not deleted.

The single material is relative to the combined material, and the combined material is a material composed of a plurality of single materials; and the meaning of composing may be understood that, when the material is posted, the plurality of materials composing the combined material are posted as a whole, for example, a basketball and a basketball hoop may be a single material or may be posted as a whole of a combined material; and the combined material needs to be used as a whole during use.

The single material is a material composed of a plurality of geometries, and the plurality of geometries composing the single material are grouped to form the material; the ungrouping is opposite to the grouping operation; the single material can be ungrouped to obtain a plurality of independent geometries; and the geometries may be understood as non-detachable minimum editing elements in the editor.

For the combined material, that the combined material is not re-created has two meanings: each material composing the combined material is not ungrouped by the creator of the virtual scene, and the whole combined material is not ungrouped; and that the whole combined material is not ungrouped means that any one material in the combined material is not deleted.

It is to be emphasized that the materials according to the embodiment of this application are not re-created by the creator of the virtual scene, including the operation such as scaling, coloring or physical effect adding. The scaling refers to adjusting the size of the single material and the combined material; the coloring refers to adjusting the color of the single material and the combined material; the physical effect adding refers to adding some special effects to the single material and the combined material, and the added special effects do not influence the structure and shape of the single material and the combined material.

Optionally, when the information of the materials used in the virtual scene is displayed, the materials used in the virtual scene can be sorted and displayed according to the sorting.

In one embodiment, materials used in the virtual scene are sorted and displayed from high to low according to the use frequency of the materials.

The use frequency refers to the number of times that the materials are used by all users in the material library.

In another embodiment, the sorting display is carried out according to the number of the materials used in the virtual scene.

The materials may be used for multiple times in the same virtual scene, the number of times that different materials are used in the virtual scene may be different; and in this embodiment, sorting is carried out according to the number of the materials used in the virtual scene.

In yet another embodiment, the sorting display is carried out according to the number of the geometries contained in the materials.

The materials are generally constructed by one or more geometries; the more the geometries in the material are, the more complex the materials is, the more exquisite the material is, correspondingly, the construction time is longer, and the construction difficulty is higher, so that in this embodiment, sorting may be carried out according to the number of the geometries contained in the materials, the materials containing a large number of geometries are in the front, which facilitates the user to collect the complex or exquisite materials; and the materials may be directly used after being collected, and thus the user can save time and labor constructing the materials.

S102: display the detail page of a target material in response to the first operation on information of the target material used in the virtual scene.

Exemplarily, the first operation is a click operation, a touch operation or a long-press operation and the like on the information of the target material; and in response to the first operation, the detail page of the target material is displayed, and the detail page of the target material includes some brief introductions of the materials, the creator of the materials, the number of times that the materials are used, and the like. As shown in FIG. 4, when a user wants to check a material "squirrel", the user can click the thumbnail or name of the material "squirrel", select the target material, and then open the detail page of the material.

Figure 5:
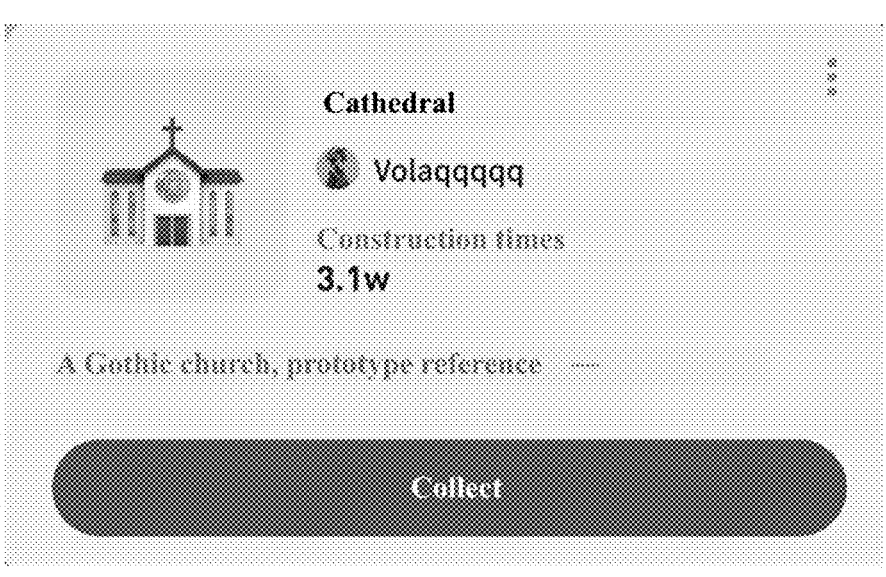
FIG. 5 is a schematic diagram of a detail page of materials.

FIG. 5 is a schematic diagram of a detail page of materials; as shown in FIG. 5, the detail page of the material further includes a collection control; and in response to a second operation on the collection control, the target material is collected into the favorite of the material library of the first user. For example, the user clicks the collection control in the figure to collect the materials into the favorite of the material library.

The materials are collected into the favorite of the material library, the user can open the material library to view the collected materials.

In this embodiment, displaying information of the material or materials used in the virtual scene in response to the viewing instruction of the first user for the virtual scene; and displaying the detail page of the target material in response to the first operation on the information of the target material used in the virtual scene. According to this method, the user may view the materials used in the virtual scene at any time before or after entering the virtual scene, and can understand and collect the materials of interest, thereby improving the utilization rate and viewing efficiency of the materials.

Figure 6:
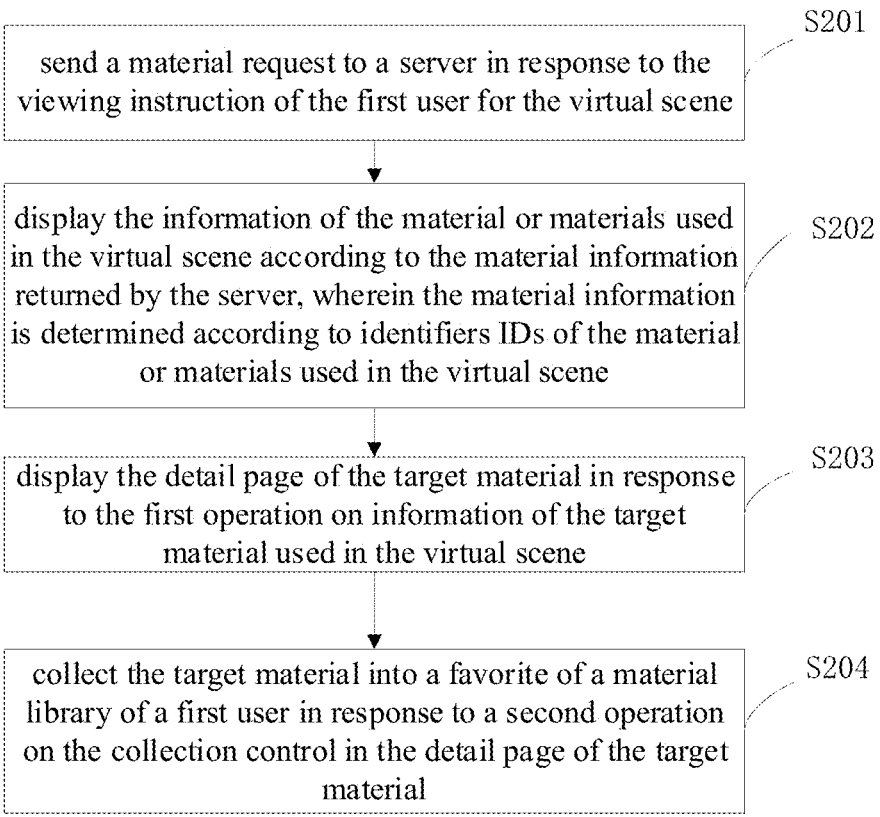
FIG. 6 is a flowchart of an interaction method according to one or more embodiments of this application.

On the basis of the one or more embodiments described above, an embodiment of this application provides an interaction method, and the same content refers to the one or more embodiments described above and is not repeated herein. FIG. 6 is a flowchart of an interaction method according to the one or more embodiments of this application; and as shown in FIG. 6, the method according to this embodiment includes the following steps.

S201: send a material request to a server in response to the viewing instruction of the first user for the virtual scene.

In this embodiment, the IDs of the materials used in the virtual scene are stored in the server; when the creator of the virtual scene posts the virtual scene, the client on the electronic device will send the IDs of the materials used in the virtual scene to the server for storage; and when the information of the materials used in the virtual scene needs to be viewed subsequently, the server will be requested which materials are used in the virtual scene.

When the checking instruction of the virtual scene is received, the client will send the material request to the server; and the material request is used for requesting the IDs of the materials or the information of the materials, and the information of the materials include the thumbnails, the names and other detail contents of the materials.

After the server receives the material request, and if the material request is used for requesting the IDs of the materials, the IDs of the materials used in the virtual scene will be sent to the client.

If the material request is used for requesting the information of the materials, the server will search the IDs of the materials used in the virtual scene according to the material request; in one embodiment, the information of the materials corresponding to the IDs of the materials is stored in the server, so the information of the materials corresponding to the IDs of the materials can be searched according to the IDs of the materials, and the information of the materials used in the virtual scene is returned to the client. In another embodiment, if the information of the materials corresponding to the IDs of the materials is not stored in the server, the server will request the information of the materials from a material storage server according to the IDs of the materials; the material storage server is used for storing the information of the materials in the material library; and the information of the material requested to be returned by the material storage server will be sent to the client.

S202: Display the information of the materials used in the virtual scene according to the material information returned by the server, the material information is determined according to identifiers (IDs) of the materials used in the virtual scene.

The IDs of the materials used in the virtual scene are sent to the server for storage when the creator of the virtual scene posts the virtual scene; if the material information returned by the server is the IDs of the materials used in the virtual scene, the client will request the material information from the material storage server according to the IDs of the materials used in the virtual scene, and display the information of the materials used in the virtual scene according to the material information returned by the material storage server. If the material information returned by the server is the information of the materials used in the virtual scene, the information of the materials used in the virtual scene will be directly displayed.

S203: display the detail page of the target material in response to the first operation on information of the target material used in the virtual scene.

S204: collect the target material into a favorite of a material library of a first user in response to a second operation on the collection control in the detail page of the target material.

In this embodiment, when the viewing instruction of the first user for the virtual scene is received, a material request will be sent to the server, and the information of materials used in the virtual scene will be displayed according to the material information returned by the server, that is, the materials used in the virtual scene are stored in the server and managed by the server, which facilitates the user to view the information of the materials used in the virtual scene.

On the basis of the one or more embodiments described above, an embodiment according to this application provides an interaction method, and the same content refers to the one or more embodiments described above and is not repeated herein. FIG. 7 is a flowchart of an interaction method according to one or more embodiments of this application; and as shown in FIG. 7, the method according to this embodiment includes the following steps.

S301: In a process of creating a target virtual scene, when a first user takes out to-be-used material from a material library of the first user, add ID of the to-be-used material into a list of the materials used in the target virtual scene created at a client.

In this embodiment, the first user may create a target virtual scene with the materials in the material library; and when starting to create the target virtual scene, the list of the materials used in the target virtual scene will be created at the client, and the list of the materials stores the IDs of the materials used in the target virtual scene.

Each time the first user takes out one to-be-used material from the material library, the ID of the to-be-used material will be added to the list of the materials used in the target virtual scene; and the to-be-used material may be the material collected by the first user, may also be the material defined by the first user, and may also be the built-in material in the material library.

S302: When the first user ungroups or deletes the to-be-used material, delete the ID of the to-be-used material from the list of the materials used in the target virtual scene; and when the to-be-used material are not ungrouped or deleted, create the target virtual scene with the to-be-used material.

The first user may perform some operations on the to-be-used material, such as scaling, coloring or adding the physical effect; and after the first user performs scaling, coloring or adding the physical effect on the to-be-used material, the IDs of the material or materials in the list of the material or materials used in the target virtual scene in relative position relations of elements composing the to-be-used material will not be influenced. If the first user performs ungrouping or deletion on the to-be-used material, the IDs of the to-be-used material will be deleted from the list of the materials used in the target virtual scene. Ungrouping performed on the to-be-used material is equivalent to changing the relative position relations of the elements composing the to-be-used material, that is, a new material will be generated equivalently, and therefore, the ID of the to-be-used material is deleted from the list of the materials used in the target virtual scene.

S303: When the target virtual scene is posted, send the IDs of the material or materials in the list of the material or materials used in the target virtual scene to a server for storage.

When posting the target virtual scene, the IDs of the material or materials in the list of the material or materials used in the target virtual scene will be sent to the server, and the list of materials includes the IDs of the materials in the material library for the target virtual scene; and when other subsequent users view the target virtual scene, the information of the material composing the target virtual scene will be requested to the server and loaded.

To better implement the interaction method according to the embodiment of this application, an embodiment of this application further provides an interaction apparatus. FIG. 8 is a structural schematic diagram of an interaction apparatus according to one or more embodiments of this application; and as shown in FIG. 8, the interaction apparatus 100 may include a first displaying module 11 and a second displaying module 12.

the first displaying module 11 is configured to display information of material or materials used in the virtual scene in response to a viewing instruction of a first user for a virtual scene;

the second displaying module 12 is configured to display a detail page of the target material in response to a first operation on information of the target material used in the virtual scene.

In some embodiments, the detail page of the target material includes a collection control; and the apparatus further includes a collection module which is configured to in response to a second operation on the collection control, collect the target material into a favorite of a material library of the first user.

In some embodiments, the displayed materials used in the virtual scene are the materials that have been posted into the material library when the virtual scene is created.

In some embodiments, the displayed materials used in the virtual scene are not re-created by the creator of the virtual scene, and that the materials are not re-created by the creator of the virtual scene includes that:

a single material composed of a plurality of geometries is not ungrouped by the creator of the virtual scene, and/or, each of materials in a combined material composed of a plurality of materials is not ungrouped by the creator of the virtual scene and any one material in the combined material is not deleted.

In some embodiments, the first displaying module 11 is specifically configured to:

in response to the viewing instruction of the first user for the virtual scene, perform sorting to display the materials used in the virtual scene from high to low according to the use frequency of the materials, or perform sorting to display the materials according to the number of the materials used in the virtual scene, or perform sorting to display the materials according to the number of geometries in the materials.

In some embodiments, the first displaying module 11 is specifically configured to:

in response to the viewing instruction of the first user for the virtual scene, send a material request to a server; and display the information of the materials used in the virtual scene according to the material information returned by the server, the material information is determined according to identifiers (IDs) of the materials used in the virtual scene, and the IDs of the materials used in the virtual scene are sent to the server for storage when the creator of the virtual scene posts the virtual scene.

In some embodiments, the apparatus further includes:

a recording module which is configured to in the process of creating a target virtual scene, when the first user takes out to-be-used material from the material library of the first user, add the ID of the to-be-used material into a list of the material or materials used in the target virtual scene created at a client, and which is further configured to when the first user ungroups or deletes the to-be-used material, delete the ID of the to-be-used material from the list of the material or materials used in the target virtual scene;

a creating module which is configured to when the to-be-used material is not ungrouped or deleted, create the target virtual scene with the to-be-used material; and a sending module which is configured to when the target virtual scene is posted, send the IDs of the materials into the list of the materials used in the target virtual scene to the server for storage.

In some embodiments, the materials used in the virtual scene are virtual objects that constitute the virtual scene.

In some embodiments, the virtual scene is a scene defined by a second user, or the materials are materials defined by the second user.

In some embodiments, the viewing instruction is triggered by the first user before entering the virtual scene;

or, the viewing instruction is triggered by the first user after entering the virtual scene.

FIG. 9 is a flow of an issuing method of a virtual object provided by the one or more embodiments of the present disclosure; and the method is applied to an XR device. As shown in FIG. 9, the method provided by this embodiment includes steps below.

S401: determining that a first user enters an extended reality scene, in response to a request of the first user to enter the extended reality scene.

The extended reality scene may be a scene provided by a client per se, or may also be a scene customized by other user himself/herself, and the extended reality scene is a 3D scene. In the XR device, in order to meet personalized needs of the user, a UGC function is added, that is, the user may customize a virtual scene (i.e. the extended reality scene) in an editor provided by a game according to his/her own needs. The user-customized virtual scene is also referred to as the user's own world, and other user may enter the user-customized scene to play.

The editor may provide edition elements such as polyhedra, controls, materials, physics, logic, music, sound effects, special effects and materials, etc. for the user to use. The user may not only customize a virtual scene in the editor, but also customize a prop. The user-customized prop may be referred to as a UGC prop; and similarly, the user-customized virtual scene may be referred to as a UGC world or a UGC scene. The customization according to the embodiment of the present disclosure may be understood as an object or a scene set up by the user independently by using edition elements provided by the editor in the editor.

Exemplarily, when the first user needs to enter an extended reality scene customized by another user, a request to enter the extended reality scene is triggered. The request may be input by the user through a controller of the XR device, or may also be input by the user through voice or gesture. The user may interact with the extended reality scene in any existing interaction mode, which will not be limited in the embodiments of the present disclosure.

For example, when the first user is playing in the game and wants to enter an extended reality scene created by another user, the first user firstly calls up a list of posted extended reality scenes; the list includes extended reality scenes created and posted by a plurality of users; and the user may select an entrance of an extended reality scene he/she is interested in, and click to enter the extended reality scene.

Optionally, before the first user enters the extended reality scene, in response to a request of the first user to view the extended reality scene, information of an attached virtual object associated with the extended reality scene is displayed, to facilitate the first user to understand the attached virtual object in the extended reality scene before entering the extended reality scene.

The information of the attached virtual object may include thumbnail and/or name of the attached virtual object. If the first user is interested in the attached virtual object in the extended reality scene through the information of the attached virtual object, he/she may enter the extended reality scene to view or claim the attached virtual object.

FIG. 10 is a schematic diagram of a detail page of an extended reality scene; as shown in FIG. 10, the page is a detail page of an extended reality scene; the detail page includes some brief introductions of the extended reality scene, an entrance to the extended reality scene, that is, the "Enter world" control in FIG. 10, and an information display region of attached virtual objects in the extended reality scene; wherein the display region is "Props in the world" in the diagram, as well as thumbnails and names below. The user may slide left and right within the display region to browse more attached virtual objects.

It may be understood that the entrance to the extended reality scene and the information of the attached virtual object may also be implemented on different pages, which will not be limited in the embodiments of the present disclosure.

S402: displaying the attached virtual object in the extended reality scene, wherein the attached virtual object is associated with the extended reality scene, and the attached virtual object is displayed in a manner different from the virtual object in the extended reality scene.

The attached virtual object may be a virtual prop; in the game scene, the virtual prop is also referred to as a game prop, and the attached virtual object is also referred to as an attached prop.

Optionally, association between the attached virtual object and the extended reality scene is set by a second user. Exemplarily, association between the attached virtual object and the extended reality scene is determined, in response to a setting request of the second user.

Optionally, before the second user associates the attached virtual object with the extended reality scene, the extended reality scene is determined as a posted scene, wherein the extended reality scene may be a scene posted by the second user, or may also be a scene posted by a user other than the second user. That is to say, the process of associating the attached virtual object with the extended reality scene may be a process independent of creating and posting the extended reality scene, so that the association process is more flexible.

Optionally, the extended reality scene is a scene customized by a third user, or the attached virtual object is a virtual object customized by the third user. It may be understood that the third user here may be the same user as the first user and the second user as described above, or may also be a different user.

When the third user is the same user as the second user, that is, when the extended reality scene is a scene customized by the second user, the second user may associate (or referred to as bind) the customized attached virtual object with the customized extended reality scene, or may also associate the attached virtual object customized by other user with the extended reality scene customized by other user, so that the attached virtual object may be displayed in the extended reality scene. When other user enters the extended reality scene, the attached virtual object may be displayed, to facilitate other user to claim or view the attached virtual object. Meanwhile, the second user may associate the customized attached virtual object with the customized extended reality scene during the process of creating the customized extended reality scene, and may re-post the extended reality scene after completing association; or may also associate a virtual prop with an existing extended reality scene after posting one customized extended reality scene.

When the third user is not the same user as the second user, that is, when the extended reality scene is a scene customized by a user other than the second user, the second user may associate a virtual prop with an existing extended reality scene created by others after a user other than the second user already posts a customized extended reality scene.

At present, with respect to a customized attached virtual object, the attached virtual object will not be displayed in the extended reality scene; the attached virtual object may only be displayed in a user backpack; the user backpack is a private item of the user and may only be viewed by the user himself/herself, and cannot be viewed by other users, thereby limiting the issuing method of the attached virtual object. The attached virtual object may usually only be gifted face-to-face, that is, when two virtual characters (avatars, also referred to as game characters) meet in an extended reality scene, an owner of the attached virtual object may choose to gift the attached virtual object to the other virtual character.

In a game scene, the backpack refers to a storage space (also referred to as a storage rack) on a game character. In the game scene, a certain number of storage racks will be set up on the game character, allowing the game character to place game equipment and game props. Meanwhile, the backpack will also display the number of virtual currencies held by the character.

Face-to-face gifting may only be implemented when both virtual characters are online, while the method according to the embodiment of the present disclosure may also implement issuing the attached virtual object offline. When the first user enters the extended reality scene, he/she may see the associated attached virtual object set by the second user in the extended reality scene, and claim the attached virtual object.

In this embodiment, the attached virtual object displayed in the extended reality scene is a 3D virtual object, that is, displayed is a real 3D model of the attached virtual object, which may bring users a more realistic interactive experience.

It may be understood that the extended reality scene per se is also composed of a plurality of virtual objects, for example, plants, houses, props, sky, rivers, controls, etc. in the extended reality scene. The attached virtual object is different from the virtual object composing the extended reality scene. The attached virtual object may exist independently of the extended reality scene. For example, the attached virtual object may be claimed by other user or gifted to other user for use by other user.

In this embodiment, the attached virtual object is displayed in a manner different from the virtual object in the extended reality scene, to facilitate the first user to recognize the attached virtual object.

Exemplarily, the attached virtual object is displayed with a special effect, while other virtual object in the extended reality scene has no special effect. The attached virtual object is differentiated from other virtual objects in the extended reality scene through the special effect. The special effect may be an attached display effect of a virtual object, for example, an attached image or text, or may also be a special change state possessed by the virtual object per se, for example, rotation, reciprocating motion between two positions, or periodic zooming in and out, which will not be limited in the embodiments of the present disclosure.

Optionally, the special effect of the attached virtual object has two states: a first state and a second state. In response to determining that the first user does not own the attached virtual object, the special effect is in the first state; in response to determining that the first user owns the attached virtual object, the special effect is in the second state.

Figure 11:
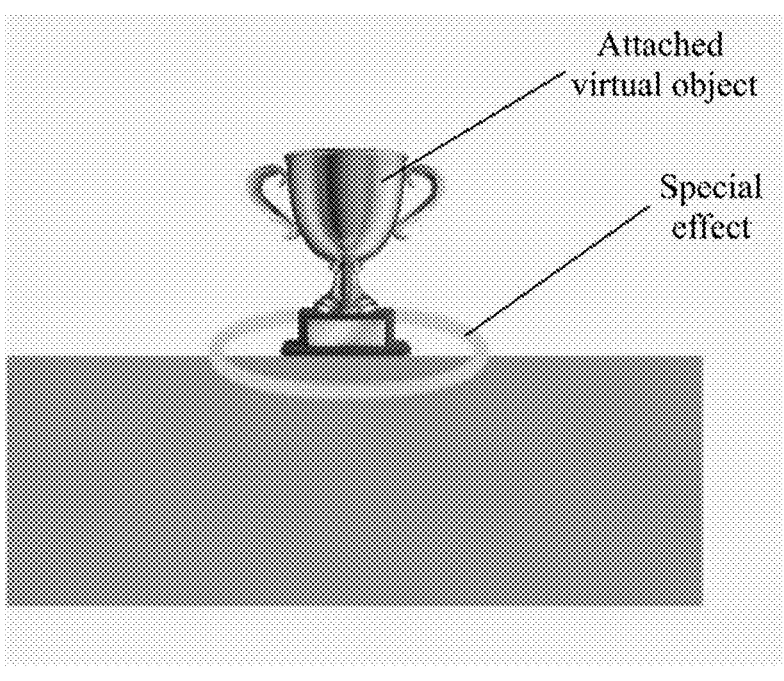
FIG. 11 is a schematic diagram of a special effect of an attached virtual object.

FIG. 11 is a schematic diagram of a special effect of an attached virtual object; as shown in FIG. 11, the attached virtual object is a trophy, and the special effect is aura surrounding the trophy. Correspondingly, the first state of the aura is a lit state, the second state is an unlit state, and the unlit state may be understood as the aura being in a gray state. Or, the first state and the second state differ in color.

Optionally, in one implementation, in response to determining that the first user does not own the attached virtual object, the attached virtual object is displayed in the extended reality scene. Correspondingly, in response to determining that the first user already owns the attached virtual object, the attached virtual object will not be displayed in the extended reality scene.

The first user owning the attached virtual object may be understood as the attached virtual object existing in the backpack of the first user. The attached virtual object in the backpack of the first user may be one that is claimed by the user himself/herself when the user last entered the extended reality scene, or may also be one that is gifted to the first user by other user, or may also be one that is won by the first user while completing a task in the game.

Optionally, in another implementation, in response to determining that the first user enters the extended reality scene for the first time, the attached virtual object will be displayed in the extended reality scene. Correspondingly, in response to determining that the first user enters the extended reality scene not for the first time, the attached virtual object will not be displayed in the extended reality scene. In the implementation, the attached virtual object may be seen by the first user only when he/she enters the extended reality scene for the first time.

In the XR device, the displaying the attached virtual object in the extended reality scene, is specifically: displaying the extended reality scene and the attached virtual object according to a first control parameter of the first user; wherein the first control parameter includes a pose parameter of the XR device, or the first control parameter includes a pose parameter of the XR device and a pose parameter of the controller of the XR device.

The pose parameter of the XR device includes a position parameter and an attitude parameter of the XR device; and the pose parameter of the controller of the XR device includes a position parameter and an attitude parameter of the controller; wherein attitude may be understood as orientation or direction of the device. The controller of the XR device may be a handheld control device such as a handle and a glove.

That is to say, in the XR device, a picture of the extended reality scene seen by the user changes with the pose parameter of the XR device, that is, changes with pose change of the user's head-mounted XR device and hand controller.

In this embodiment, in response to the request of the first user to enter the extended reality scene, it is determined that the first user enters the extended reality scene. The attached virtual object is displayed in the extended reality scene; the attached virtual object is associated with the extended reality scene; and the attached virtual object is displayed in a manner different from the virtual object in the extended reality scene. In the method, by associating the attached virtual object with the extended reality scene, when the first user enters the extended reality scene, the attached virtual object is displayed in the extended reality scene, to facilitate the first user to understand or claim the attached virtual object, which enriches the issuing mode of the attached virtual object.

Figure 12:
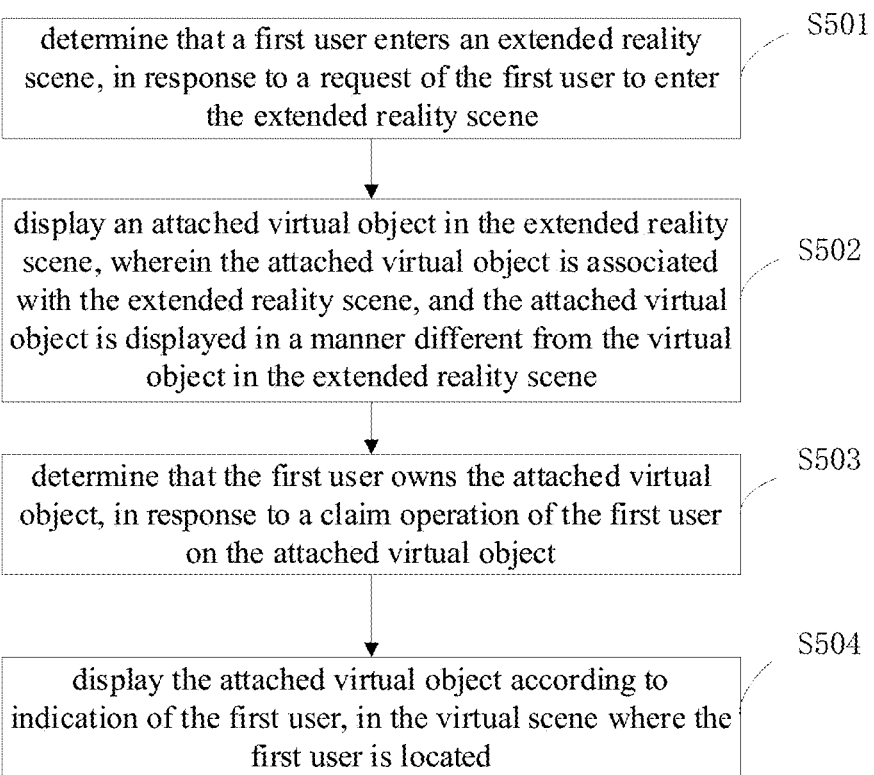
FIG. 12 is a flowchart of an issuing method of a virtual object provided by one or more embodiments of the present disclosure.

On the basis of the one or more embodiments described above, an embodiment of the present disclosure provide an issuing method of a virtual object, and this embodiment focuses on introducing a claiming method of the virtual object. FIG. 12 is a flowchart of an issuing method of a virtual object provided by the one or more embodiments of the present disclosure; as shown in FIG. 12, the method provided by this embodiment includes steps S501 to S502 below.

S501: determining that a first user enters an extended reality scene, in response to a request of the first user to enter the extended reality scene.

S502: displaying an attached virtual object in the extended reality scene, wherein the attached virtual object is associated with the extended reality scene, and the attached virtual object is displayed in a manner different from the virtual object in the extended reality scene.

Description of the one or more embodiments may be referred to for specific implementations of step S501 to step S502, and no details will be repeated here.

S503: determining that the first user owns the attached virtual object, in response to a claim operation of the first user on the attached virtual object.

Optionally, in this embodiment, the attached virtual object may be displayed in a fixed position in the extended reality scene, and the attached virtual object cannot be moved by any user. Or, the position may be adjusted by the second user when setting association between attached virtual object and the extended reality scene.

For example, the first user may claim the attached virtual object in two modes as follows.

Claim mode 1: a virtual character approaches the attached virtual object with a bare hand, then a detail card of the attached virtual object will be automatically displayed; and the virtual character views the detail card and manually acquires the attached virtual object.

FIG. 13 is a schematic diagram of a claim process of an attached virtual object; as shown in FIG. 13, after the first user enters the extended reality scene, the attached virtual object "trophy" is displayed in the extended reality scene, the trophy is surrounded with a special effect, and the special effect is in the first state, indicating that the trophy is claimed by the first user. At this time, the virtual character corresponding to the first user approaches the trophy with a bare hand; and here the "bare hand" refers to that there are no other objects in the hand of the virtual character. When a distance between the bare hand of the virtual character and the trophy is less than or equal to a first preset distance, that is, when the two are close enough to each other, the detail card of the trophy will be automatically displayed.

The detail card of the trophy is displayed with a claim control, exemplarily, the claim control is a "Put in backpack" control shown in FIG. 13. Optionally, the detail card of the attached virtual object further includes other content, for example, introduction to the attached virtual object, information of creator of the attached virtual object, and the number of times the attached virtual object is claimed.

After clicking on the claim control in the detail card, the trophy is put in the backpack of the first user. After this claim is completed, the special effect changes to the second state. Exemplarily, the aura shown in FIG. 13 changes from bright to dark. The user determines that the trophy has been successfully claimed according to the aura state, wherein putting the trophy in the backpack of the first user means that the first user owns the trophy.

Optionally, after putting the trophy in the backpack of the first user, the state of the claim control changes from green to gray, and the text on the claim control changes to "Already in backpack".

Optionally, after the trophy is put in the backpack of the first user, a toast pop-up window displays that the trophy is already in the backpack.

Claim mode 2: the virtual character approaches the attached virtual object with a scanning tool, then a detail card of the attached virtual object is automatically displayed; and the virtual character views the detail card and manually acquires the attached virtual object.

The scanning tool is a tool for fetching a detail card of an attached virtual object; as shown in FIG. 13, the scanning tool is a magnifying glass. When the virtual character holds the magnifying glass and approaches the trophy to scan, the detail card of the trophy will be automatically displayed. A subsequent claim process is the same as Mode 1, and no details will be repeated here.

After the attached virtual object is claimed by the first user, the claim state of the attached virtual object in the extended reality scene is recorded as a claimed state, that is, it is recorded that the attached virtual object in the extended reality scene is already claimed by the first user. When the first user enters the extended reality scene again, the state of the attached virtual object is in the claimed state, so that the first user cannot claim the attached virtual object again, until the first user removes the attached virtual object from the backpack.

The claimed state of the attached virtual object in the extended reality scene may be represented as follows: the special effect of the attached virtual object changes to the second state, and when the first user views the detail card of the attached virtual object, the claim control is displayed as "Already in backpack".

Optionally, in a case where the first user owns an attached virtual object that has not been actively claimed, after the user enters the extended reality scene, a state of the attached virtual object that has not been actively claimed is in an unclaimed state, that is, the special effect of the attached virtual object is in the first state, so the first user may click on the claim control. However, after the first user clicks on the claim control, a pop-up window will pop up saying "This attached virtual object has been claimed", and the attached virtual object will no longer be added to the backpack of the first user.

The attached virtual object that has not been actively claimed may be one that is gifted by other user, or the extended reality scene associated with the attached virtual object that has not been actively claimed is updated, and the attached virtual object that has not been actively claimed still exists in the updated scene.

It may be understood that in the embodiment of the present disclosure, the first user owning an attached virtual object is not limited to putting the attached virtual object in the backpack, but may also be placing the attached virtual object elsewhere. The first user owning an attached virtual object may also be the user acquiring an ID of the attached virtual object, so that subsequently, the user may request relevant information of the attached virtual object from the server according to the ID, and the server may also perform association management on the ID of the attached virtual object and the first user. It may be understood that the mode of the first user owning the attached virtual object may also be implemented in a mode such as actively obtaining or accepting gifts before entering the current extended reality scene.

S504: displaying the attached virtual object according to indication of the first user, in the virtual scene where the first user is located.

After the first user owns the attached virtual object, the first user may use the attached virtual object. Here the virtual scene where the first user is located may be the extended reality scene associated with the attached virtual object, that is, the extended reality scene where the first user is located when claiming the attached virtual object, or may also be other extended reality scene. For example, if the first user claims the attached virtual object in an extended reality scene created by other user, the first user may use the attached virtual object in the extended reality scene created by the first user, or may also use the attached virtual object in the current extended reality scene, or may also use the attached virtual object in the extended reality scene created by other user.

In this embodiment, the displaying the attached virtual object according to indication of the first user may include scenarios below: displaying the attached virtual object in the backpack of the first user; taking out the attached virtual object from the backpack of the first user and holding the attached virtual object in hand; taking out the attached virtual object from the backpack of the first user, releasing hand to place the attached virtual object to a designated position; and moving the attached virtual object from one position to another in the extended reality scene.

In the XR device, the displaying the attached virtual object in the virtual scene where the first user is located, is specifically, displaying the extended reality scene and the attached virtual object according to the first control parameter of the first user and indication of the first user, wherein the first control parameter includes a pose parameter of the XR device, or the first control parameter includes a pose parameter of the XR device and a pose parameter of the controller of the XR device.

The pose parameter of the XR device includes a position parameter and an attitude parameter of the XR device; and the pose parameter of the controller of the XR device includes a position parameter and an attitude parameter of the controller; wherein attitude may be understood as orientation or direction of the device. The controller of the XR device may be a handheld control device such as a handle and a glove.

That is to say, in the XR device, a picture of the extended reality scene seen by the user changes with the pose parameter of the XR device, that is, changes with pose change of the user's head-mounted XR device and hand controller.

In this embodiment, the attached virtual object displayed according to the first control parameter of the first user and the indication of the first user is a 3D object; the user may perform operations such grip, rotate, etc. on the 3D object, that is, the attached virtual object claimed by the virtual character is an actual object, and the attached virtual object is used in the same way as a physical object, thereby bringing the user with immersive experience.

In this embodiment, in response to the request of the first user to enter the extended reality scene, it is determined that the first user enters the extended reality scene. The attached virtual object is displayed in the extended reality scene; the attached virtual object is associated with the extended reality scene; and the attached virtual object is displayed in a manner different from the virtual object in the extended reality scene. In response to a claim operation of the first user on the attached virtual object, it is determined that the first user owns the attached virtual object. In the virtual scene where the first user is located, the attached virtual object is displayed according to the indication of the first user. In the method, the first user may claim the attached virtual object displayed in an extended reality scene after entering the extended reality scene, which enriches an issuing mode of the attached virtual object.

On the basis of the one or more embodiments described above, an embodiment of the present disclosure provides an issuing method of a virtual object, for associating an attached virtual object with an extended reality scene, and determining association between the attached virtual object and the extended reality scene in response to a setting request of a second user. That is, before displaying the attached virtual object in the extended reality scene, the attached virtual object is associated with the extended reality scene according to the setting request and a setting operation of the second user.

With respect to some user-customized virtual objects, after creating the virtual object, the user will post the attached virtual object in his/her backpack for the user to use. However, other user cannot view and use the virtual object. Only after the user gifts the virtual object to other user may other user use the virtual object. It may be understood that, after acquiring a virtual object customized by other user, it is also difficult for the user to share the same with other user, so that the issuing mode of the virtual object is too unitary.

In order to solve the problem of the prior art, an embodiment of the present disclosure provides a method for associating a virtual object customized by a user himself/herself or a virtual object customized by other user as an attached virtual object with an extended reality scene. After association, the attached virtual object may be displayed in the associated extended reality scene. When other user enters the extended reality scene, he/she may see the attached virtual object and claim the same.

FIG. 14 is a flowchart of an associating method of a virtual object and an extended reality scene provided by the one or more embodiments of the present disclosure; as shown in FIG. 14, the method provided by this embodiment includes steps below.

S601: fetching a reward control in an edition space of an editor, wherein the reward control is used to associate a posted attached virtual object.

In order to associate the virtual object with the extended reality scene, this embodiment provides a reward control in the editor, and the reward control is used to associate the posted attached virtual object with the extended reality scene. Therefore, the reward control according to this embodiment may also be referred to as an association control.

The reward control plays a role in: associating the attached virtual object posted by the user in the backpack, so that after the user posts an extended reality scene, when other user enters the extended reality scene, the attached virtual object may be loaded and displayed through an identifier (ID) of the attached virtual object associated with the reward control, and when seeing the attached virtual object in the extended reality scene, other user may see appearance of the attached virtual object through interaction and claim the attached virtual object.

Figure 15:
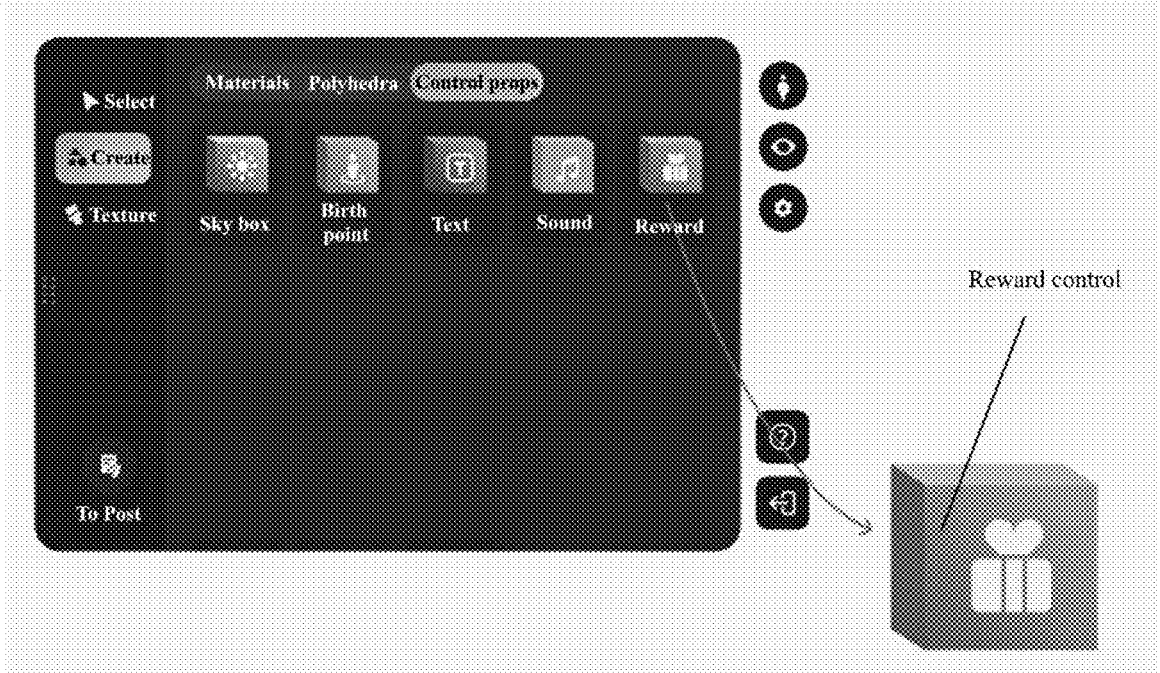
FIG. 15 is a schematic diagram of a fetch interface of a reward control.

FIG. 15 is a schematic diagram of a fetch interface of a reward control; as shown in FIG. 15, the user opens the extended reality scene in the edition space of the editor, finds the reward control from the "Control props" menu bar, and moves the reward control to the extended reality scene. Exemplarily, the user may control a ray to hover onto an icon of the reward control in the UI interface through a handle, and click the "trigger" button to move the reward control to the extended reality scene. The user may freely drag the reward control and place the reward control in a desired position. Here is just an example, and there are other ways to move the reward control to the extended reality scene.

Optionally, before the reward control is associated with the attached virtual object, one or more of operations below may be performed on the reward control according to a user operation: scaling, position adjustment. Scaling refers to adjusting a size of the reward control, and position adjustment refers to adjusting a position of the reward control in an extended reality scene.

Optionally, after performing scaling and/or position adjustment on the reward control, relevant content of the operation is recorded.

It should be noted that the attached virtual object associated with reward control is not limited to the user-customized attached virtual object, but may also be an attached virtual object acquired by the user through any channel, for example, an attached virtual object gifted by other user.

S602: displaying a detail interface of the reward control, in response to a first operation on the reward control, wherein the detail interface includes a selection control.

Exemplarily, the first operation is a click operation, a double-click operation, a long-press operation, or a hover operation, etc. on the reward control, which will not be limited in the embodiments of the present disclosure.

When the first operation is detected, the detail interface of the reward control is displayed, the detail interface includes a selection control, and the selection control is used to select an attached virtual object that needs to be associated.

S603: selecting an attached virtual object from the posted attached virtual objects in response to the selection operation on the selection control, and associating the attached virtual object with the reward control.

Exemplarily, the selection operation is a click operation, a double-click operation, a long-press operation, or a hover operation, etc. on the selection control, which will not be limited in the embodiments of the present disclosure.

According to the selection operation, a list of unassociated attached virtual objects is displayed for the user to choose from. An unassociated attached virtual object is a posted virtual object. After selecting an attached virtual object, the user associates the attached virtual object with the reward control.

Optionally, in response to the selection operation on the selection control, the attached virtual object is displayed and the reward control is hidden, wherein the attached virtual object is displayed with identification information thereon; and the identification information is used to identify association between the attached virtual object and the reward control.

Figure 16:
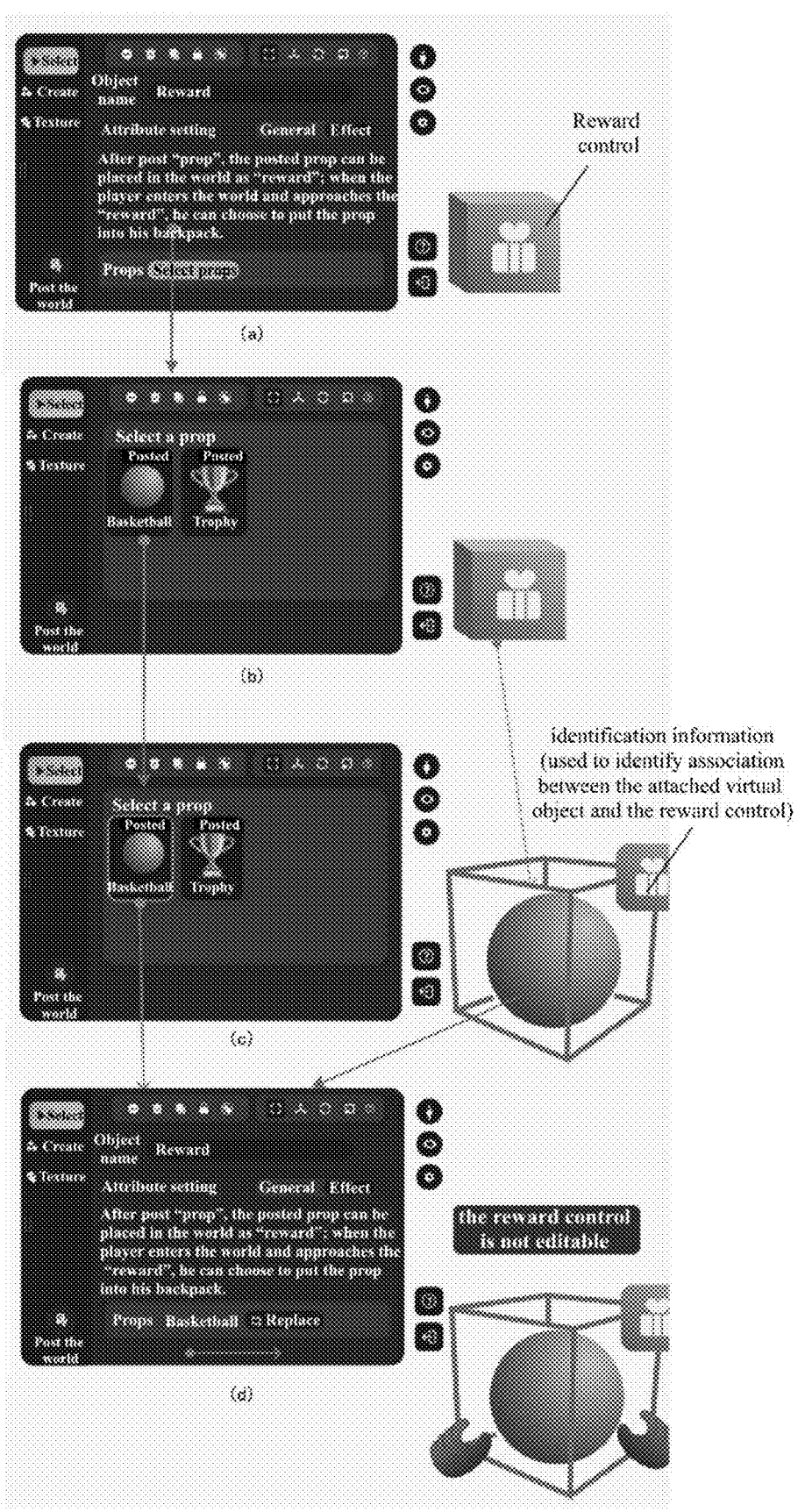
FIG. 16 is a schematic diagram of interface transformation during a process of associating a reward control with an attached virtual object.

FIG. 16 is a schematic diagram of interface transformation during a process of associating a reward control with an attached virtual object; as shown in FIG. 16, after the user clicks on the reward control, the interface shown in FIG. 16 (*a*) is displayed. In the interface, a setting page is displayed with a selection control, that is, the "Select prop" control in the interface shown in FIG. 16 (*a*). After the user performs the selection operation on the selection control, the interface changes to an interface shown in FIG. 16 (*b*), and the interface shown in FIG. 16 (*b*) exhibits a list of unassociated attached virtual objects for the user to choose from.

After the user selects one of the attached virtual objects, that is, "sphere", the interface changes to an interface shown in FIG. 16 (*c*), that is, in the extended reality scene, the attached virtual object is displayed and the reward control is hidden. Meanwhile, the attached virtual object "sphere" is displayed with identification information, to indicate association between the attached virtual object and the reward control.

Optionally, in the interface shown in FIG. 16 (*c*), the attached virtual object "sphere" is displayed at an original size thereof, and the original size may be understood as an actual size of the attached virtual object when really displayed in the extended reality scene.

Optionally, after the user selects the attached virtual object "sphere", a configuration interface shown in FIG. 16 (*c*) changes to a configuration interface of the reward control shown in FIG. 16 (*d*), or, in response to a second operation on the associated attached virtual object shown in FIG. 16 (*c*), the configuration interface shown in FIG. 16 (*d*) is displayed, and the second operation may be a click operation, a double-click operation, or a long-press operation.

In the configuration interface shown in FIG. 16 (*d*), the reward control may be configured. Exemplarily, one or more of configuration operations below is performed on the reward control in the configuration interface:

(1) Configuring a position and/or an attitude of the reward control, wherein the position and/or the attitude of the attached virtual object associated with the reward control changes with the reward control.

(2) Configuring a size of the reward control, wherein a size of the attached virtual object associated with the reward control does not change with the size of the reward control.

Through the configuration interface, only the size of the reward control may be adjusted, but the size of the virtual object associated with the reward control remains unchanged. At this time, the reward control is invisible to the user.

(3) Replacing the attached virtual object associated with the reward control.

The user may replace the attached virtual object associated with the reward control, for example, replace the attached virtual object "sphere" associated with the reward control with "trophy".

In this embodiment, after associating the reward control with the attached virtual object, the parameter and permission of the attached virtual object according to the present disclosure will not be changed. The permission may be re-gifting permission of the attached virtual object. If the gift permission of the attached virtual object is "re-gifting by owner is forbidden", other users cannot re-gift the attached virtual object to another after claiming the attached virtual object. If the re-gifting permission of the attached virtual object is "re-gifting by owner is allowed", other users may re-gift the attached virtual object to another after claiming the attached virtual object.

When the attached virtual object associated with the reward control is deleted or removed, the association relationship becomes invalid. When other user enters the extended reality scene, the deleted or removed attached virtual object will not be displayed in the extended reality scene.

If the reward control is deleted in the extended reality scene, the association relationship becomes invalid, so that when other user enters the extended reality scene, the attached virtual object associated with the deleted reward control will not be displayed in the extended reality scene.

In this embodiment, a reward control is defined; the detail interface of the reward control is displayed in response to the first operation on the reward control; the detail interface includes a selection control; in response to the selection operation on the selection control, an attached virtual object is selected from the posted attached virtual objects; and the attached virtual object is associated with the reward control. By associating the reward control with the attached virtual object, association between the attached virtual object and the extended reality scene is implemented. The method is convenient for associating the attached virtual object with the extended reality scene.

Figure 17:
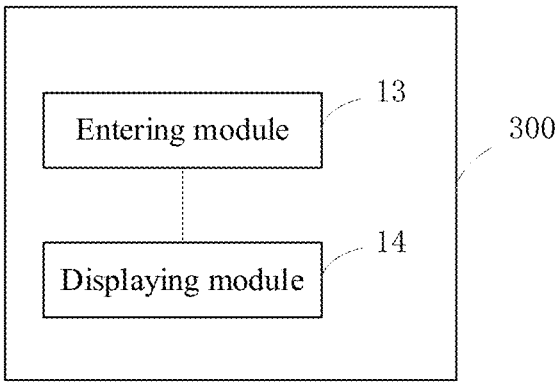
FIG. 17 is a schematic structural diagram of an issuing apparatus of a virtual object provided by one or more embodiments of the present disclosure.

In order to facilitate better implementation of the issuing method of the virtual object according to the embodiment of the present disclosure, an embodiment of the present disclosure further provides an issuing apparatus of a virtual object. FIG. 17 is a schematic structural diagram of an issuing apparatus of a20 virtual object provided by the one or more embodiments of the present disclosure; as shown in FIG. 17, the issuing apparatus 300 of the virtual object may include:

an entering module 13, configured to determine that a first user enters an extended reality scene, in response to a request of the first user to enter the extended reality scene; and a displaying module 14, configured to display the attached virtual object in the extended reality scene, wherein the attached virtual object is associated with the extended reality scene, and the attached virtual object is displayed in a manner different from the virtual object in the extended reality scene.

In some embodiments, the displaying module 14 is specifically configured to: display the extended reality scene and the attached virtual object according to a first control parameter of the first user, wherein the first control parameter includes a pose parameter of the XR device, or the first control parameter includes a pose parameter of the XR device and a pose parameter of a controller of the XR device.

In some embodiments, the apparatus further includes a claiming module, which is configured to determine that the first user owns the attached virtual object, in response to a claim operation of the first user on the attached virtual object.

In some embodiments, after the determining that the first user owns the attached virtual object, the displaying module 14 is further configured to: display the attached virtual object according to indication of the first user, in the virtual scene where the first user is located.

In some embodiments, the displaying module 14 is specifically configured to: display the attached virtual object in the extended reality scene, in response to determining that the first user does not own the attached virtual object.

In some embodiments, the displaying module 14 is specifically configured to: display the attached virtual object in the extended reality scene, in response to determining that the first user enters the extended reality scene for the first time.

In some embodiments, the displaying module 14 is specifically configured such that:

The attached virtual object is displayed with a special effect; and the special effect is in a first state, in response to determining that the first user does not own the attached virtual object; and The special effect is in a second state, in response to determining that the first user owns the attached virtual object.

In some embodiments, before the determining that the first user enters the extended reality scene in response to a request of the first user to enter the extended reality scene, the displaying module 14 is further configured to display information of the attached virtual object associated with the extended reality scene, in response to a request of the first user to view the extended reality scene.

In some embodiments, the apparatus further includes an associating module, configured to: determine association between the attached virtual object and the extended reality scene, in response to a setting request of a second user.

In some embodiments, before the determining association between the attached virtual object and the extended reality scene, in response to a setting request of a second user, the associating module is further configured to: determine that the extended reality scene is a posted scene.

In some embodiments, the associating module is specifically configured to:

fetch a reward control in an edition space of an editor, wherein the reward control is used to associate a posted attached virtual object;

display a detail interface of the reward control, in response to a first operation on the reward control, wherein the detail interface includes a selection control; and select an attached virtual object from the posted attached virtual objects in response to the selection operation on the selection control, and associate the attached virtual object with the reward control.

In some embodiments, the associating module is further configured to perform one or more of operations below on the reward control according to a user operation: scaling, position adjustment, before the reward control is associated with the attached virtual object.

In some embodiments, the associating module is specifically configured to display the attached virtual object and hide the reward control, in response to the selection operation on the selection control, wherein the attached virtual object is displayed with identification information thereon; and the identification information is used to identify association between the attached virtual object and the reward control.

In some embodiments, the associating module is further configured to display a configuration interface of the reward control, in response to a second operation on the associated attached virtual object, and configure the reward control in the configuration interface.

In some embodiments, one or more of the configuration operations below is performed on the reward control in the configuration interface:

configuring a position and/or an attitude of the reward control, wherein the position and/or the attitude of the attached virtual object associated with the reward control changes with the reward control;

configuring a size of the reward control, wherein a size of the attached virtual object associated with the reward control does not change with the size of the reward control; and replacing the attached virtual object associated with the reward control.

In some embodiments, the extended reality scene is a scene customized by a third user, or the attached virtual object is a virtual object customized by the third user.

NPC stands for non-player character, which is a type of character in games, meaning a non-player character, referring to a game character that is not controlled by a real player in electronic games.

AR technology is a technique that cleverly integrates virtual information with the real world, which widely utilizes various technical means such as multimedia, three-dimensional modeling, real-time tracking and registration, intelligent interaction, and sensing, to perform analog simulation on computer-generated virtual information such as text, images, three-dimensional models, music, and videos, and then apply the same to the real world. The two types of information complement each other, thereby implementing an "augmented" real world.

VR technology, also referred to as virtual reality or spiritual realm technology, is the latest development achievement implemented by using various high-tech technologies and primarily by using computer technology, which utilizes devices such as computers to create a realistic virtual world with various sensory experiences such as three-dimensional vision, touch, and smell, thereby creating a sense of immersion for those in the virtual world.

MR is a further development of virtual reality technology, which presents virtual scene information in a real scene and builds an interactive feedback information loop between the real world, the virtual world, and the user, to enhance realism of user experience.

Global Positioning System (GPS): a high-precision radio navigation positioning system based on artificial Earth satellites, which may provide accurate geographic location, vehicle speed, and precise time information anywhere of the world and near Earth space.

XR refers to combination of reality and virtuality through computers to create a human-computer interactive virtual environment, which is also a collective term for various technologies such as AR, VR, MR, etc. By integrating the visual interaction technology of the above three, XR brings a seamless sense of "immersion" between the virtual world and the real world to the experiencer.

In related technologies, in an XR scenario, when a user selects a specific object, he/she usually controls a handheld apparatus, to accurately align a virtual apparatus corresponding to the handheld apparatus with the specific object for selection. This wastes a lot of time, and reduces efficiency of operating on the specific object, resulting in poor user experience.

The present disclosure provides an object selecting method, a device, an electronic device and a non-transient computer readable medium, to solve the technical problems at present that in the XR scenario where the user has to control the handheld apparatus, to accurately align a virtual apparatus corresponding to the handheld apparatus with the specific object for selection, which wastes a lot of time, and reduces efficiency of operating on the specific object, resulting in poor user experience.

Hereinafter, specific embodiments are provided for detailed explanation of the technical solutions of the present disclosure and how the technical solutions of the present disclosure solve the above-described technical problems. The following specific embodiments may be combined with each other; and same or similar concepts or processes may not be repeated in some embodiments. Hereinafter, the embodiments of the present disclosure will be described in conjunction with the accompanying drawings.

Figure 18:
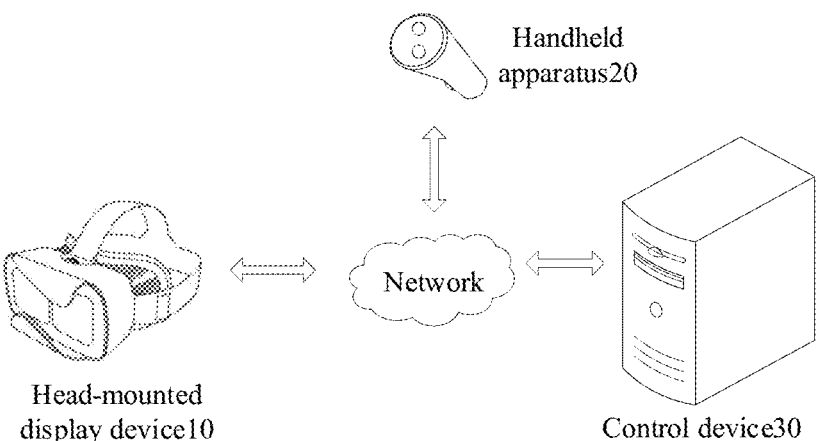
FIG. 18 is a schematic structural diagram of a system provided by one or more embodiments of the present disclosure.

FIG. 18 is a schematic structural diagram of a system provided by one or more embodiments of the present disclosure; the system includes: a head-mounted display device 10, a handheld apparatus 20, and a control device 30, etc.; the head-mounted display device 10, the handheld apparatus 20, and the control device 30 are connected through a network, for example, connected through a wired or wireless network.

In an optional embodiment, the head-mounted display device 10 and the handheld apparatus 20 are used for the user to wear and to interact with the user. Specifically, the user may interact with the head-mounted display device 10 or display content in the head-mounted display device 10 by means of any one or more of the handheld apparatus 20, voice, eyeballs, etc. Moreover, the head-mounted display device 10 exhibits display content; and the display content may be content of a virtual reality picture, content of a mixed reality picture, content of an augmented reality picture, or other types of content.

The foregoing control device 30 may be a device such as a terminal or a server. The terminal may be a smart phone, a tablet, a laptop, a smart voice interacting device, a smart home appliance, and other devices. The terminal may further include a client; the client may be a video client, a browser client, or an instant messaging client, etc. The server may be an independent physical server, or may also be a server cluster composed of a plurality of physical servers, or a distributed system, or may also be a cloud server providing cloud services, cloud databases, cloud computing, cloud functions, cloud storage, network services, cloud communication, middleware services, domain name services, security services, content delivery network (CDN), as well as basic cloud computing services such as big data and artificial intelligence platform, etc.

The foregoing control device 30 may be configured to provide the foregoing display content to the head-mounted display device 10.

In some embodiments, when an exhibition picture received from the control device 30 is displayed in the head-mounted display device 10, the control device 30 may be configured to execute a data processing method below: acquiring first pose information of a scan object in the scene and a scan body parameter corresponding to the scan object, wherein the first pose information includes first position information and first attitude information; determining a scan range of the scan object according to the first pose information and the scan body parameter; acquiring a plurality of pieces of second position information of a plurality of candidate objects within the scan range; and determining a selected object from the plurality of candidate objects, based on the first position information and the plurality of pieces of second position information. The scan object, the plurality of candidate objects, and the selected object may be exhibited in the above-described exhibition picture.

Optionally, the head-mounted display device 10 may be provided with a monitor; and the exhibition picture exhibited on the monitor may be a three-dimensional picture.

Optionally, the scene may be a virtual reality scene, a mixed reality scene, or an extended reality scene; and the scene may be specifically a three-dimensional space game scene, etc.

Optionally, the scan object may be a virtual object in the scene, for example, the scan object may include but is not limited to any one of: a virtual scanning gun, a virtual magnifying glass, or a virtual flashlight.

Optionally, the user may control the scan object by means of any one of: operating the handheld apparatus 20, voice, eyeball, etc.

Optionally, the scan body parameter may include scan body type and scan body exhibition parameter.

Optionally, the plurality of candidate objects may be virtual objects in the scene, for example, the plurality of candidate objects may include: virtual objects in the scene corresponding to other user participating in the scene, virtual objects preset in the scene, for example, virtual persons, virtual animals, virtual plants, virtual items, etc.

In another optional embodiment, the foregoing data processing method may further be executed by the head-mounted display device 10 per se; and the system may only include the head-mounted display device 10 and the handheld apparatus 20, that is, the head-mounted display device 10 is an all-in-one machine. Specifically, the head-mounted display device 10 is configured to: acquire first pose information of an scan object in a scene and a scan body parameter corresponding to the scan object, wherein the first pose information includes first position information and first attitude information; determine a scan range of the scan object according to the first pose information and the scan body parameter; acquire a plurality of pieces of second position information of a plurality of candidate objects within the scan range; and determine a selected object from the plurality of candidate objects, based on the first position information and the plurality of pieces of second position information.

Detailed implementation of the foregoing object selecting method, as well as specific functions of the head-mounted display device 10, the handheld apparatus 20, and the control device 30 as described above, will be respectively explained in detail below. It should be noted that the description order of the following embodiments does not serve as a limitation on the priority order of the embodiments.

FIG. 19 is a schematic flowchart of an object selecting method provided by one or more embodiments of the present disclosure; an executing subject of the method may be the above-described head-mounted display device 10, or may also be the foregoing control device 30. The method includes at least step S701 to step S704 below:

S701: acquiring first pose information of a scan object in a scene and a scan body parameter corresponding to the scan object, wherein the first pose information includes first position information and first attitude information;

Optionally, the scene may be a virtual reality scene, a mixed reality scene, or an extended reality scene; and the scene may be specifically a three-dimensional space game scene, etc.

Optionally, the scan object is a virtual object corresponding to a handheld apparatus in the scene. For example, the scan object may include but is not limited to any one of: a virtual scanning gun, a virtual magnifying glass, a virtual flashlight, or a virtual camera.

In some optional embodiments provided by the present disclosure, the handheld apparatus may include a handle, a motion capture glove, etc.

Optionally, the first position information is coordinate information of the scan object in a camera coordinate system (i.e. the above-described scene); and the first attitude information is attitude information of the scan object in the camera coordinate system (i.e. the above-described scene).

Optionally, with respect to the determining the first pose information of the scan object in the scene, the method further includes step S01 to step S02:

S01: acquiring second pose information of the handheld apparatus;

Optionally, the second pose information includes second position information and second attitude information, wherein the second position information is coordinate information of the handheld apparatus in a world coordinate system (i.e. the real world), and the second attitude information is attitude information of the handheld apparatus in the world coordinate system (i.e. the real world).

Optionally, the coordinate information of the handheld apparatus in the world coordinate system (i.e. the real world) may be determined according to a positioning function of the handheld apparatus. Specifically, relevant technologies, for example, GPS technology, may be referred to for the determining the coordinate information of the handheld apparatus in the world coordinate system (i.e. the real world), and no details will be repeated here.

S02: determining first pose information of the scan object in the scene according to the second pose information.

Optionally, in step S02, the determining first pose information of the scan object in the scene according to the second pose information, includes step S021 to step S022:

S021: acquiring a preset conversion relationship and first preset offset information, wherein the preset conversion relationship includes coordinate information in the world coordinate system and an association relationship with the coordinate information in the camera coordinate system (i.e. the above-described scene).

S022: determining the first pose information of the scan object in the scene, according to the second pose information, the preset conversion relationship, and the first preset offset information.

Optionally, third pose information of the scan object in the scene is determined according to the second pose information and the preset conversion relationship; and pose information in the scene whose offset amount from the third pose information is the first preset offset information is taken as the first pose information of the scan object in the scene. The first preset offset information may include an offset parameter of position and/or attitude, so that when the user uses the scan object in the scene, the scan range of the scan object may be more matched with the scan object.

Optionally, the user may control the scan object by operating the handheld apparatus, for example, the user adjusts the first pose information of the scan object by adjusting the second pose information of the handheld apparatus. The user may be a player participating in the current scene, for example, may be a player wearing the head-mounted display device and/or the handheld apparatus.

Optionally, the scan body parameter may be flexibly set by the user or relevant personnel.

In some optional embodiments provided by the present disclosure, with respect to a mode of acquiring the scan body parameter, the method further includes:

> exhibiting a setting interface for the user to set the scan body parameter; and
> acquiring the scan body parameter set by the user through the setting interface.

In an optional implementation, when the object selecting method is executed by the head-mounted display device, a setting interface for the user to set the scan body parameter may be exhibited on the monitor in the head-mounted display device.

In another optional implementation, when the object selecting method is executed by the control device, the monitor in the head-mounted display device may be controlled exhibiting a setting interface for the user to set the scan body parameter, and acquiring the scan body parameter set by the user through the setting interface sent by the head-mounted display device.

Optionally, the above-described setting interface may display an input box and a virtual keyboard, allowing the user to trigger the virtual keyboard through the handheld apparatus to select or input the scan body parameter in the input box, thereby acquiring the scan body parameter set by the user through the setting interface. This may improve flexibility of setting the scan body parameter and bring the user with fun experience.

Optionally, the scan body parameter may include scan body type and scan body exhibition parameter. The scan body exhibition parameter is related to the scan body type.

Optionally, the scan body type is any one of: frustum, cone, polygonal pyramid, and conical frustum.

Optionally, when the scan body type is a frustum, the scan body parameter may include at least some of parameters below: offset pose information of respective vertices among a plurality of vertices of the frustum relative to the first pose information of the scan object, wherein the offset pose information includes offset displacement information and offset attitude information; the scan body parameter may further include: the number of a plurality of edges on a top face of the frustum, lengths of respective edges among the plurality of edges, lengths of respective edges among the plurality of edges on a bottom face of the frustum, lengths of a plurality of side edges of the frustum, included angles from respective side edges among the plurality of side edges of the frustum respectively to the top face and/or the bottom face, and a height between the top face and the bottom face of the frustum.

Optionally, when the scan body type is a cone, the scan body parameter may include at least some of parameters below: a length of a generatrix of the cone, a radius and a diameter of a bottom face of the cone, a height of the cone, and an included angle between the generatrix of the cone and the height of the cone.

Optionally, when the scan body type is a polygonal pyramid, the scan body parameter may include at least some of parameters below: offset pose information of respective vertices among a plurality of vertices of a bottom face of the polygonal pyramid relative to the first pose information of the scan object, wherein the offset pose information includes offset displacement information and offset attitude information; the scan body parameter may further include: the number of edges of the bottom face of the polygonal pyramid and lengths of the respective edges, lengths of respective side edges among the plurality of side edges of the polygonal pyramid, included angles between the respective side edges and the bottom face, a height of the polygonal pyramid, etc.

Optionally, when the scan body type is a conical frustum, the scan body parameter may include at least some of parameters below: a radius (or a diameter) of a top face of the conical frustum, a radius (or a diameter) of a bottom face of the conical frustum, a height of the conical frustum, and a length of a generatrix of the conical frustum.

Optionally, the scan body type may further be any one of: sphere, ellipsoid, bipyramid, etc.

When the scan body type is a sphere, the scan body parameter may include: a radius or a diameter of the sphere.

When the scan body type is an ellipsoid, the scan body parameter may include: an equatorial radius and a polar radius of the ellipsoid.

When the scan body type is a bipyramid, the scan body parameter may include: the number of edges on a bottom face of one of the cones in the bipyramid and lengths of the respective edges, lengths of respective side edges among a plurality of side edges of the cone, and a height of the cone.

It may be understood that the scan body may further be any other geometric body, which will not be specifically limited in the present disclosure. Meanwhile, the scan body parameter further includes scan reference point information. With respect to scan bodies with different geometric shapes, the scan body parameter may include vertex position information, top-face center point position information, centroid position information, spherical center position information, or other preset positioning key point position information of the scan body.

In some optional embodiments provided by the present disclosure, with respect to execution conditions of the above-described step S701, the method further includes:

triggering execution of acquiring the first pose information of the scan object in the scene and the scan body parameter corresponding to the scan object, in response to an operation instruction of the user to activate a scan mode; or stopping execution of acquiring the first pose information of the scan object in the scene and the scan body parameter corresponding to the scan object, in response to an operation instruction of the user to deactivate a scan mode.

Optionally, a first button may be provided in the handheld apparatus, and FIG. 20 is a schematic structural diagram of a handheld apparatus provided by one or more embodiments of the present disclosure; in a case where the current scene is not in a scan mode, it is determined that the user activates an operation of the scan mode, in response to detecting that the first button is triggered; in a case where the current scene is in a scan mode, it is determined that the user deactivates an operation of the scan mode, in response to detecting that the first button is triggered.

S702: determining the scan range of the scan object according to the first pose information and the scan body parameter.

Optionally, the scan range of the scan object may refer to a coordinate range in the scene, or may also refer to a plurality of coordinates in the scene.

In some optional embodiments provided by the present disclosure, with respect to a cross section of the scan body enclosed by the scan range, an area of a first cross section close to the scan object is less than an area of a second cross section away from the scan object, wherein the cross section is perpendicular to an orientation of the scan object.

Optionally, areas of a plurality of cross sections of the scan body increase as distances between the cross sections and the scan object increase.

Optionally, areas of the plurality of cross sections of the scan body increase firstly and then decrease as the distances between the cross sections and the scan object increase, which may reduce data processing workload for the first object in the scene that is further away from the scan object, thereby improving efficiency of object selection.

Optionally, in step S702, the determining the scan range of the scan object according to the first pose information and the scan body parameter, includes step S7021 to step S7022:

S7021: determining scan reference point information of the scan body according to the first position information included in the first pose information, wherein with respect to scan bodies with different geometric shapes, the scan body parameter may include vertex position information, top-face center point position information, centroid position information, spherical center position information, or other preset positioning key point position information of the scan body.

Optionally, when the scan body type included in the scan body parameter is a frustum or a conical frustum, the scan reference point information may be position information of the top-face center point of the scan body.

When the scan body type included in the scan body parameter is a cone or a polygonal pyramid, the reference point position information may be the vertex position information of the scan body.

In one implementation, in step S7021, the determining scan reference point information of the scan body according to the first position information included in the first pose information, includes: determining the first position information included in the first pose information as the scan reference point information of the scan body.

In another implementation, in step S7021, the determining scan reference point information of the scan body according to the first position information included in the first pose information, includes:

acquiring second preset offset information, wherein the second preset offset information is used to indicate a position offset amount between the first position information and the scan reference point information; and taking a sum of the first position information included in the first pose information and the second preset offset information as the scan reference point information of the scan body.

The above-described second preset offset information may include an offset parameter of position and/or attitude, so that when the user uses the scan object in the scene, the scan range of the scan object may be more matched with the scan object.

S7022: determining coordinate information of a scan axis of the scan object according to the first pose information.

Optionally, the scan axis passes through a center of the scan object.

Optionally, the scan axis further corresponds to directional information.

S7023: taking the coordinate information of the scan axis as coordinate information of a central axis of the scan body.

S7024: determining the scan range of the scan object according to the scan reference point information and the coordinate information of the central axis of the scan body.

S703: acquiring a plurality of pieces of second position information of the plurality of candidate objects located within the scan range.

Optionally, the candidate objects may be virtual objects located within the scan range; the virtual objects may include virtual objects in the scene corresponding to other user participating in the scene, non-player characters (NPCs) in the scene, virtual animals, virtual plants, virtual items, etc. in the scene.

Optionally, the candidate objects are in one-to-one correspondence with the pieces of second position information; the second position information may be coordinate information of the candidate object in the camera coordinate system; and the second position information of the candidate object may refer to position information of a center of the candidate object.

In some optional embodiments provided by the present disclosure, in step S703, the acquiring a plurality of pieces of second position information of the plurality of candidate objects within the scan range, includes step S7031 to step S7033:

S7031: determining a plurality of second objects that collide with the scan body enclosed by the scan range, from a plurality of first objects located in the scene.

Optionally, the first object may be at least some virtual objects in the scene.

Optionally, in step S7031, the determining a plurality of second objects that collide with the scan body enclosed by the scan range, from a plurality of first objects located in the scene, includes step S11 to step S13:

S11: acquiring a coordinate range included in space occupied by the first object, with respect to respective first objects among the plurality of first objects located in the scene; and S12: determining whether the first object collides with the scan body enclosed by the scan range, according to the coordinate range included in the space occupied by the first object and the scan range.

Optionally, in step S12, the determining whether the first object collides with the scan body enclosed by the scan range, according to the coordinate range included in the space occupied by the first object and the scan range, includes:

determining that the first object collides with the scan body enclosed by the scan range, when there is coordinate information included within the scan range, in the coordinate range included in the space occupied by the first object; and determining that the first object does not collide with the scan body enclosed by the scan range, when there is no coordinate information included in the scan range, in the coordinate range included in the space occupied by the first object.

S13: determining the first object as the second object that collides with the scan body enclosed by the scan range, in response to determining that the first object collides with the scan body enclosed by the scan range, and further determining a plurality of second objects that collide with the scan body enclosed by the scan range.

S7032: taking the plurality of second objects as a plurality of candidate objects within the scan range;

S7033: acquiring a plurality of pieces of second position information of the plurality of candidate objects.

S704: determining a selected object from the plurality of candidate objects, based on the first position information and the plurality of pieces of second position information.

Optionally, the selected object may be a candidate object closest to the scan object among the plurality of candidate objects.

In some optional embodiments provided by the present disclosure, in step S704, the determining a selected object from the plurality of candidate objects, based on the first position information and the plurality of pieces of second position information, includes step S7041 to step S7043:

S7041: determining distances between respective pieces of second position information among the plurality of pieces of second position information and the first position information, to obtain a plurality of distances corresponding to the plurality of pieces of second position information;

S7042: acquiring a minimum distance among the plurality of distances;

S7043: taking a candidate object located at the second position information corresponding to the minimum distance among the plurality of candidate objects as the selected object.

Figure 21:
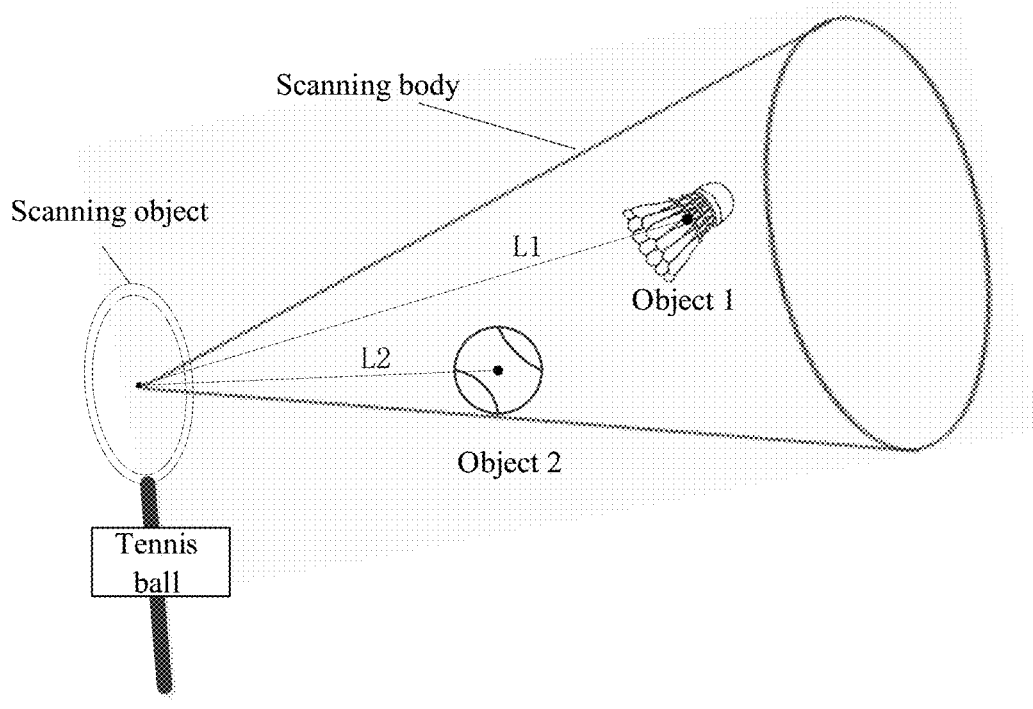
FIG. 21 is a schematic scene diagram of an object selecting method provided by one or more embodiments of the present disclosure.

Optionally, when the scan body type is a cone, referring to FIG. 21, FIG. 21 is a schematic scene diagram of the object selecting method provided by one or more embodiments of the present disclosure; object 1 and object 2 are 2 candidate objects; L1 is a distance between second position information of object 1 and first position information of the scan object; and L2 is a distance between second position information of object 2 and first position information of the scan object. Assuming a minimum distance between L1 and L2 is L2, with respect to object 1 and object 2, object 2 located at the second position information corresponding to the minimum distance L2 is taken as selected object.

In some optional embodiments provided by the present disclosure, with respect to the exhibition content in the exhibition picture in the head-mounted display device, the method further includes: exhibiting the selected object in a manner different from remaining candidate objects among the plurality of candidate objects except the selected object.

Optionally, the exhibiting the selected object in a manner different from remaining candidate objects among the plurality of candidate objects except the selected object, includes: adjusting a color of a borderline corresponding to the selected object in the exhibition picture to a first preset color, and adjusting a color of borderlines of the remaining candidate objects among the plurality of candidate objects except the selected object in the exhibition picture to a second preset color. The first preset color is different from the second preset color.

Optionally, after determining the selected object, the above-described method further includes exhibiting name information of the selected object in a preset region, wherein the preset region may be on the scan object, specifically referring to FIG. 21.

Optionally, after determining the selected object, name information of the plurality of candidate objects may be exhibited in the exhibition picture, wherein the name information of the selected object may be exhibited in a manner different from the remaining candidate objects except the selected object, for example, an exhibition color of the name information of the selected object may be adjusted to be a color different from an exhibition color of the name information of the remaining candidate objects except the selected object.

In some optional embodiments provided by the present disclosure, the method further includes: exhibiting detail information corresponding to the selected object, in response to a detail exhibition operation instruction for the selected object.

Optionally, still referring to FIG. 20, the handheld apparatus may further be provided with a second button. In a case where the selected object is determined, it is determined to trigger the detail exhibition operation instruction for the selected object, in response to detecting that the second button is triggered. This allows the user to quickly acquire the detail information of the selected object through simple operation steps, which improves efficiency of information acquisition by the user and enhances user experience.

In an optional implementation, when the object selecting method is executed by the head-mounted display device, the detail information corresponding to the selected object may be exhibited on the monitor in the head-mounted display device.

In another optional implementation, when the object selecting method is executed by the control device, the detail information corresponding to the selected object may be sent to the head-mounted display device, to further control the monitor in the head-mounted display device exhibiting the detail information corresponding to the selected object.

Optionally, the detail information corresponding to the selected object may be exhibited in a form of card.

Optionally, the detail information corresponding to the selected object may be flexibly set by relevant personnel. For example, the detail information corresponding to the selected object may include any one or more of: picture information of the selected object, name information of the selected object, brief introduction of the selected object, and user information related to the selected object, wherein the user information related to the selected object may be information of a user who currently selects the selected object, or may also be information of a user who most recently operates the selected object; and the user information may include user identification, user name, and the number of times the user has operated the selected object.

When the selected object is a tennis ball, referring to FIG. 22, FIG. 22 is a schematic diagram of detail information corresponding to a tennis ball provided by one or more embodiments of the present disclosure, the diagram includes: picture information of the tennis ball, name information of the tennis ball, brief introduction of the tennis ball, and user information related to the tennis ball, wherein the user information related to the tennis ball may be information of a user who currently selects the tennis ball, and the user information may include user identification, user name (abc) and the number of times the user has played the tennis ball (23 times played).

In the solution provided by the present disclosure of acquiring the first pose information of the scan object in the scene and the scan body parameter corresponding to the scan object, wherein the first pose information includes the first position information and the first attitude information; determining the scan range of the scan object according to the first pose information and the scan body parameter; acquiring the plurality of pieces of second position information of the plurality of candidate objects within the scan range; and determining the selected object from the plurality of candidate objects, based on the first position information and the plurality of pieces of second position information, a larger scan range may be used to scan the plurality of candidate objects, and the candidate object closest to the scan object within the scan range may be determined as the selected object without precise selection, which saves operation time and improves efficiency of object selection. This further improves efficiency of operating the selected object and enhances user experience.

FIG. 23 is a schematic structural diagram of a data processing apparatus 40 provided by one or more embodiments of the present disclosure; wherein the apparatus 60 includes an acquiring unit 61 and a determining unit 62.

The acquiring unit 61 is configured to acquire first pose information of a scan object in a scene and a scan body parameter corresponding to the scan object, wherein the first pose information includes first position information and first attitude information. The determining unit 62 is configured to determine a scan range of the scan object according to the first pose information and the scan body parameter.

In at least an embodiment, the acquiring unit 61 is further configured to acquire a plurality of pieces of second position information of a plurality of candidate objects located within the scan range; the determining unit 62 is further configured to determine a selected object from the plurality of candidate objects, based on the first position information and the plurality of pieces of second position information.

In some optional embodiments provided by the present disclosure, with respect to a cross section of the scan body enclosed by the scan range, an area of a first cross section close to the scan object is less than an area of a second cross section away from the scan object, wherein the cross section is perpendicular to an orientation of the scan object.

In some optional embodiments provided by the present disclosure, the scan body type is any one of the group consisting of: frustum, cone, polygonal pyramid and conical frustum.

In some optional embodiments provided by the present disclosure, when configured to determine a selected object from the plurality of candidate objects, based on the first position information and the plurality of pieces of second position information, the determining unit 62 is specifically configured to: determine distances between respective pieces of second position information among the plurality of pieces of second position information and the first position information, to obtain a plurality of distances corresponding to the plurality of pieces of second position information; acquire a minimum distance among the plurality of distances; and take a candidate object located at second position information corresponding to the minimum distance among the plurality of candidate objects as the selected object.

In some optional embodiments provided by the present disclosure, when configured to acquire a plurality of pieces of second position information of a plurality of candidate objects within the scan range, the acquiring unit 61 is specifically configured to:

determine a plurality of second objects that collide with the scan body enclosed by the scan range, from a plurality of first objects located in the scene;

take the plurality of second objects as a plurality of candidate objects located within the scan range; and acquire a plurality of pieces of second position information of the plurality of candidate objects.

In some optional embodiments provided by the present disclosure, the apparatus 60 is further configured to exhibit the selected object in a manner different from remaining candidate objects among the plurality of candidate objects except the selected object.

In some optional embodiments provided by the present disclosure, the apparatus 60 is further configured to trigger execution of acquiring the first pose information of the scan object in the scene and the scan body parameter corresponding to the scan object, in response to an operation instruction of the user to activate a scan mode.

In some optional embodiments provided by the present disclosure, the scan object is a virtual object corresponding to a handheld apparatus in the scene, and the apparatus 60 is further configured to: acquire second pose information of the handheld apparatus; and determine first pose information of the scan object in the scene according to the second pose information.

In some optional embodiments provided by the present disclosure, the apparatus 60 is further configured to: exhibit a setting interface for the user to set the scan body parameter; and acquire the scan body parameter set by the user through the setting interface.

In some optional embodiments provided by the present disclosure, the apparatus 60 is further configured to exhibit detail information corresponding to the selected object, in response to a detail exhibition operation instruction for the selected object.

It is to be understood that the apparatus embodiments and the method embodiments may correspond to each other, and similar descriptions may refer to the method embodiments. To avoid repetition, it will not be repeated herein.

The apparatus 100 according to at least one embodiment of this application is described from the perspective of functional modules in conjunction with the accompanying drawings. It is to be understood that the functional modules may be realized in the form of hardware, may also be realized in the form of software instructions, and may also be realized by combining hardware and software modules. Specifically, the steps of the method embodiments in the embodiments of this application may be completed through an integrated logic circuit of hardware in a processor and/or instructions in the form of software, and in combinations with the steps of with the method disclosed by the embodiment of this application, it may be directly embodied in that a hardware decoding processor executes and completes the steps, or the hardware and software modules in the decoding processor are combined to execute and complete the steps. Optionally, the software module may be stored in a storage medium that is well-known in the art, such as a random access memory, a flash memory, a read-only memory, a programmable read-only memory, an electrically erasable programmable memory, or a register. The storage medium is located in a memory, and the processor reads information in the memory and completes the steps in the method embodiments in combination with hardware of the processor.

An embodiment of this application also provides an electronic device. FIG. 24 is a structural schematic diagram of an electronic device according to one or more embodiments of this application; and as shown in FIG. 24, the electronic device 200 may include a memory 23 and a processor 21.

The memory 23 is configured to store a computer program and send a program code to the processor 21. In other words, the processor 21 may invoke and execute the computer program from the memory 23 to execute the method according to the embodiment of this application.

For example, the processor 21 can execute the above method embodiments according to the instructions in the computer programs.

In some embodiments of this application, the processor 21 may include, but be not limited to: a general purpose processor, a digital signal processor (DSP), an application specific integrated circuit (ASIC), a field programmable gate array (FPGA) or other programmable logic devices, discrete gates or transistor logic devices, discrete hardware components, and the like.

In some embodiments of this application, the memory 23 includes, but is not limited to: a volatile memory and/or a non-volatile memory. The non-volatile memory may be a read-only memory (ROM), a programmable ROM (PROM), an erasable PROM (EPROM), an electrically erasable EPROM (EEPROM), or a flash memory. The volatile memory 10 may be a random access memory (RAM) that serves as an external cache. By way of example but not limiting explanation, many forms of RAM may be used, such as static RAM (SRAM), dynamic RAM (DRAM), synchronous DRAM (SDRAM), double data rate SDRAM (DDR SDRAM), enhanced SDRAK (ESDRAM), synch link DRAM (SLDRAM) and direct Rambus RAM (DR RAM).

In some embodiments of this application, the computer program may be divided into one or more modules, and the one or more modules are stored in the memory 23 and executed by the memory 22 to complete the method according to this application. The one or more modules may be a series of computer program instruction segments capable of performing specific functions, the instruction segments are used to describe the execution of the computer program in the electronic device.

As shown in FIG. 24, the electronic device may further include: a communication interface 22, and the communication interface 22 can be connected to the processor 21 or memory 23.

The processor 21 may control the communication interface 22 to communicate with other devices, specifically, it may send information or data to other devices, or receive the information or data from other devices. The communication interface 22 may include a transmitter and a receiver. The communication interface 22 may further include one or more antennas.

It is to be understood that the electronic device 200, not shown in FIG. 24, may further include a camera module, a wireless fidelity WIFI module, a positioning module, a Bluetooth module, a display, a controller, etc., which are not described herein.

It is to be understood that all components in the electronic device are connected through a bus system, and the bus system includes a power bus, a control bus and a state signal bus besides a data bus.

This application further provides a computer storage medium; a computer program is stored in the computer storage medium; and when the computer program is executed by a computer, the computer can execute the method according to the method embodiments. Or, an embodiment of this application further provides a computer program product containing an instruction, and the instruction enables the computer to execute the method according to the method embodiments when being executed by the computer.

This application also provides a computer program product, which includes a computer program stored in a computer readable storage medium. The processor of the electronic device reads the computer program from the computer-readable storage medium, and the processor executes the computer program, causing the electronic device to execute the corresponding process in the control method of user position in the virtual scene in the embodiment of this application. For simplicity, it will not be repeated herein.

In the several embodiments provided in this application, it is to be understood that, the disclosed client may be implemented in another manner. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network modules. Some or all of the modules may be selected according to actual needs to achieve the objectives of the solutions of the embodiments. In addition, functional modules in the embodiments of in this application may be integrated into one processing module, or each of the modules may exist alone physically, or two or more modules are integrated into one module.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the appended claims.

What is claimed is:

1. An interaction method, comprising:
   displaying a page in response to a viewing instruction of a first user for a virtual scene, wherein the page comprises an interface element configured to enter the virtual scene and a display area configured to display one or more materials used in the virtual scene;
   displaying a thumbnail and a name corresponding to each of the one or more materials in the display area of the page;
   displaying a detailed page of a target material among the one or more materials in response to an operation performed on a thumbnail or a name corresponding to the target material, wherein the detailed page of the target material comprises a collection control; and
   adding the target material as a favorite in response to an operation performed on the collection control in the detailed page of the target material.

2. The method according to claim 1, wherein the method further comprises:
   adding the target material into the favorite of a material library of the first user.

3. The method according to claim 1, wherein the one or more materials used in the virtual scene are materials that have been posted into a material library when the virtual scene is created.

4. The method according to claim 3, wherein the one or more materials used in the virtual scene are not re-created by a creator of the virtual scene, wherein the one or more materials not re-created by the creator of the virtual scene comprises:
   a single material composed of a plurality of geometries is not ungrouped by the creator of the virtual scene, and/or each of materials in a combined material composed of a plurality of materials is not ungrouped by the creator of the virtual scene and any one material in the combined material is not deleted.

5. The method according to claim 1, wherein the one or more materials comprise a plurality of materials, and the method further comprises:
   performing sorting to display the plurality of materials used in the virtual scene from high to low according to a usage frequency of the plurality of materials, or performing sorting to display the plurality of materials according to a usage number of the plurality of materials in the virtual scene, or performing sorting to display the plurality of materials according to a number of geometries contained in the plurality of materials in response to the viewing instruction of the first user for the virtual scene.

6. The method according to claim 1, further comprising:

sending a material request to a server in response to the viewing instruction of the first user for the virtual scene; and displaying the information of the one or more materials used in the virtual scene according to material information returned by the server, wherein the material information is determined according to one or more identifiers (IDs) of the one or more materials used in the virtual scene, and the one or more IDs of the one or more materials used in the virtual scene is sent to the server for storage when a creator of the virtual scene posts the virtual scene.

7. The method according to claim 1, further comprising:

in a process of creating a target virtual scene, adding an identifier (ID) of a to-be-used material into a list of the one or more materials used in the target virtual scene created at a client when the first user takes out the to-be-used material from a material library of the first user;

deleting the ID of the to-be-used material from the list of the one or more materials used in the target virtual scene when the first user ungroups or deletes the to-be-used material;

creating the target virtual scene with the to-be-used material when the to-be-used material is not ungrouped or deleted; and sending the IDs of the materials in the list of the materials used in the target virtual scene to a server for storage when the target virtual scene is posted.

8. The method according to claim 1, wherein the one or more materials used in the virtual scene are virtual objects that constitute the virtual scene.

9. The method according to claim 1, wherein the virtual scene is a scene defined by a second user, or the one or more materials are materials defined by the second user.

10. The method according to claim 1, wherein the viewing instruction is triggered by the first user before entering the virtual scene; or the viewing instruction is triggered by the first user after entering the virtual scene.

11. An electronic device, comprising:

at least one processor and at least one memory, wherein the at least one memory stores computer programs; the at least one processor is configured to invoke and execute the computer programs stored in the at least one memory to execute operations comprising:

displaying a page in response to a viewing instruction of a first user for a virtual scene, wherein the page comprises an interface element configured to enter the virtual scene and a display area configured to display one or more materials used in the virtual scene;

displaying a thumbnail and a name corresponding to each of the one or more materials in the display area of the page;

displaying a detailed page of a target material among the one or more materials in response to an operation performed on a thumbnail or a name corresponding to the target material, wherein the detailed page of the target material comprises a collection control; and adding the target material as a favorite in response to an operation performed on the collection control in the detailed page of the target material.

12. The electronic device according to claim 11, wherein the one or more materials used in the virtual scene are materials that have been posted into a material library when the virtual scene is created.

13. The electronic device according to claim 11, wherein the one or more materials comprises a plurality of materials, and the operations further comprise:

performing sorting to display the plurality of materials used in the virtual scene from high to low according to a usage frequency of the plurality of materials, or performing sorting to display the plurality of materials according to a usage number of the plurality of materials in the virtual scene, or performing sorting to display the plurality of materials according to a number of geometries contained in the plurality of materials in response to the viewing instruction of the first user for the virtual scene.

14. The electronic device according to claim 11, the operations further comprising:

sending a material request to a server in response to the viewing instruction of the first user for the virtual scene; and displaying the one or more materials used in the virtual scene according to material information returned by the server, wherein the material information is determined according to one or more identifiers (IDs) of the one or more materials used in the virtual scene, and the one or more IDs of the one or more materials used in the virtual scene is sent to the server for storage when a creator of the virtual scene posts the virtual scene.

15. The electronic device according to claim 11, wherein the virtual scene is a scene defined by a second user, or the one or more materials are materials defined by the second user.

16. A non-transitory computer readable storage medium, storing computer programs, wherein the computer programs, upon being executed by at least one processor, cause the at least one processor to execute operations comprising:

displaying a page in response to a viewing instruction of a first user for a virtual scene, wherein the page comprises an interface element configured to enter the virtual scene and a display area configured to display one or more materials used in the virtual scene;

displaying a thumbnail and a name corresponding to each of the one or more materials in the display area of the page;

displaying a detailed page of a target material among the one or more materials in response to an operation performed on a thumbnail or a name corresponding to the target material, wherein the detailed page of the target material comprises a collection control; and adding the target material as a favorite in response to receiving an operation performed on the collection control in the detailed page of the target material.

17. The non-transitory computer readable storage medium according to claim 16, wherein the one or more materials used in the virtual scene are materials that have been posted into a material library when the virtual scene is created.

18. The non-transitory computer readable storage medium according to claim 16, wherein the one or more materials comprises a plurality of materials, and the operations further comprise:

performing sorting to display the plurality of materials used in the virtual scene from high to low according to a usage frequency of the plurality of materials, or performing sorting to display the plurality of materials according to a usage number of the plurality of materials in the virtual scene, or performing sorting to display the plurality of materials according to a number of geometries contained in the plurality of materials in response to the viewing instruction of the first user for the virtual scene.

19. The non-transitory computer readable storage medium according to claim 16, the operations further comprising:

sending a material request to a server in response to the viewing instruction of the first user for the virtual scene; and displaying the one or more materials used in the virtual scene according to material information returned by the server, wherein the material information is determined according to one or more identifiers (IDs) of the one or more materials used in the virtual scene, and the one or more IDs of the one or more materials used in the virtual scene is sent to the server for storage when a creator of the virtual scene posts the virtual scene.

20. The non-transitory computer readable storage medium according to claim 16, wherein the virtual scene is a scene defined by a second user, or the one or more materials are materials defined by the second user.

\* \* \* \* \*